US010721245B2

(12) United States Patent
Song et al.

(10) Patent No.: US 10,721,245 B2
(45) Date of Patent: Jul. 21, 2020

(54) METHOD AND DEVICE FOR AUTOMATICALLY VERIFYING SECURITY EVENT

(71) Applicant: KOREA INSTITUTE OF SCIENCE AND TECHNOLOGY INFORMATION, Daejeon (KR)

(72) Inventors: Jungsuk Song, Daejeon (KR); Jangwon Choi, Daejeon (KR); Sangsoo Choi, Daejeon (KR); Heeseok Kim, Daejeon (KR); Jiyeon Choi, Daejeon (KR); Younsu Lee, Daejeon (KR)

(73) Assignee: KOREA INSTITUTE OF SCIENCE AND TECHNOLOGY INFORMATION, Daejeon (KR)

( * ) Notice: Subject to any disclaimer, the term of this patent is extended or adjusted under 35 U.S.C. 154(b) by 72 days.

(21) Appl. No.: 15/768,002

(22) PCT Filed: Feb. 15, 2016

(86) PCT No.: PCT/KR2016/001512
§ 371 (c)(1),
(2) Date: Apr. 12, 2018

(87) PCT Pub. No.: WO2017/069348
PCT Pub. Date: Apr. 27, 2017

(65) Prior Publication Data
US 2018/0309772 A1 Oct. 25, 2018

Related U.S. Application Data

(60) Provisional application No. 62/243,143, filed on Oct. 19, 2015.

(51) Int. Cl.
*H04L 9/00* (2006.01)
*H04L 29/06* (2006.01)

(52) U.S. Cl.
CPC ...... *H04L 63/1416* (2013.01); *H04L 63/0236* (2013.01); *H04L 63/10* (2013.01);
(Continued)

(58) Field of Classification Search
CPC .................................................. H04L 63/1416
See application file for complete search history.

(56) References Cited

U.S. PATENT DOCUMENTS

| | | | |
|---|---|---|---|
| 2003/0145226 A1* | 7/2003 | Bruton, III | H04L 63/0263 726/22 |
| 2005/0204404 A1 | 9/2005 | Hrabik et al. | |

(Continued)

FOREIGN PATENT DOCUMENTS

| | | |
|---|---|---|
| KR | 10-2003-0056652 A | 7/2003 |
| KR | 10-2012-0000942 A | 1/2012 |

(Continued)

OTHER PUBLICATIONS

International Search Report in International Application No. PCT/KR2016/001512, dated Jul. 1, 2016.
Jungsuk Song et al., "Automated Verification Methodology of Security Events Based on Heuristic Analysis", International Journal of Distributed Sensor Networks, vol. 2015, Sep. 27, 2015.
(Continued)

*Primary Examiner* — Josnel Jeudy
(74) *Attorney, Agent, or Firm* — Park, Kim & Suh, LLC

(57) ABSTRACT

The present invention relates to a method and a device for automatically verifying a security event. The method for automatically verifying a security event, according to one embodiment of the present invention, comprises the steps of: receiving a security event and information related to the security event; extracting a feature of the security event; classifying the security event; and verifying the security event.

20 Claims, 19 Drawing Sheets

(52) U.S. Cl.
CPC ............ *H04L 63/101* (2013.01); *H04L 63/12* (2013.01); *H04L 63/1433* (2013.01); *H04L 63/1441* (2013.01); *H04L 69/22* (2013.01)

(56) References Cited

U.S. PATENT DOCUMENTS

| | | | |
|---|---|---|---|
| 2008/0209557 | A1 | 8/2008 | Herley et al. |
| 2015/0096022 | A1 | 4/2015 | Vincent et al. |
| 2015/0180890 | A1 | 6/2015 | Ronen et al. |

FOREIGN PATENT DOCUMENTS

| | | | |
|---|---|---|---|
| KR | 10-2014-0027616 A | | 3/2014 |
| KR | 10-1436874 B1 | | 9/2014 |
| KR | 10-1499116 B1 | | 3/2015 |
| WO | 2014/209914 A1 | | 12/2014 |

OTHER PUBLICATIONS

Kyu-il Kim et al., "A Study on Collection and Analysis Method of Malicious URLs Based on Darknet Traffic for Advanced Security Monitoring and Response", Journal of the Korea Institute of Information Security and Cryptology 24(6), Dec. 2014, 1185-1195 (11pages).

Jungsuk Song et al., "Automated Verification Methodology of Security Events Based on Heuristic Analysis," International Journal of Distributed Sensor Networks, vol. 11, Issue 9, (Jan. 1, 2015).

Kyu-il Kim et al., "An Auto-Verification Method of Security Events Based on Empirical Analysis for Advanced Security Monitoring and Response", Journal of the Korea Institute of Information Security and Cryptology 24(3), Jun. 2014, 507-522 (16pages).

Korean Notice of Allowance in Appln. No. 10-2016-0017260 dated Dec. 15, 2016.

Korean Notice of Allowance in Appln. No. 10-2016-0017266 dated Dec. 15, 2016.

* cited by examiner

FIG. 3

| Essential item | Institute IP list |
|---|---|
| Additional item | Black IP list |
| | White IP list |
| | Black FQDN list |
| | White FQDN list |
| | String lists for the five attack types |

FIG. 4

| Attack TYpe | Strings for true positives | |
|---|---|---|
| Malicious URL | USER | POST |
| | CWD | PASS |
| | /ttt/sty.htm | user-agent : wget |
| | NICK | |
| Malware download | - | |
| Malware infection | GhOst | X.C... |
| | x.Kc".... | o.b.j.e.c.t |
| | t.a.b.l.e | &&&&& |
| | filepath= | filename= |
| | RooKIE | |
| Information transmission | mac= | username= |
| | os= | WolfDDos |
| | register | #information |
| | avs= | prj= |
| | ver= | logdata= |
| | pwd= | Windows |
| | ie= | ADDNEW |
| | MB | MHz |
| | provider | uin= |
| | machine | nickname |
| | npki | ip |
| | uid= | name |
| | cpuname= | mobile |
| File upload | EasyPhpWebShell | zecmd |
| | idssvc | iesvc |
| | Action=MainMenu | Action=ScanPort |
| | JspSpy Ver | Not Found Shell |
| | .asp.jpg | .php.jpg |
| | 200 OK | |

FIG. 5

| | |
|---|---|
| | Source IP |
| | Destination |
| | Source Port |
| Static components | Destination Port |
| | Host |
| | Payload |
| | HTTP Referer |
| | The number of security events |
| | Host URL |
| Dynamic components | Get URL |
| | Website source code |
| | Destination Port |

FIG. 14

| Attack Type | The number of signature rules | | | |
|---|---|---|---|---|
| | 2013 | 2014 | 2015 | Unique signature rules |
| Malicious URL | 27 | 13 | 5 | 36 |
| Malware download | 4 | 2 | 1 | 5 |
| Malware infection | 43 | 26 | 19 | 52 |
| Information transmission | 10 | 8 | 3 | 14 |
| File upload | 12 | 15 | 10 | 21 |
| Threshold | - | 6 | - | 6 |
| Total | 96 | 70 | 38 | 134 |

FIG. 15

| | Event name | Number of total security events | | | Number of total security events | | | Number of total security events | | | Accuracy |
|---|---|---|---|---|---|---|---|---|---|---|---|
| | | 2013 | 2014 | 2015 | 2013 | 2014 | 2015 | 2013 | 2014 | 2015 | |
| 1 | cn*****er | 443,032 | 157,594 | 89,182 | 66 | 17 | 18 | 442,966 | 157,577 | 89,164 | 100% |
| 2 | bl**.****.com.cn | 3,150 | 6,882 | 59,861 | 13 | 0 | 0 | 3,137 | 6,882 | 59,861 | 100% |
| 3 | qaz***.***.org | 260,712 | 47,526 | 36,608 | 11 | 6 | 0 | 260,701 | 475,254 | 36,608 | 100% |
| 4 | R***ng | 35,792 | 13,173 | 35 | 10 | 2 | 1 | 35,782 | 13,171 | 34 | 100% |
| 5 | us****nt:ly | 33 | 0 | 0 | 6 | 0 | 0 | 27 | 0 | 0 | 100% |
| 6 | http-**** | 34,111 | 10,807 | 0 | 4 | 0 | 0 | 34,107 | 10,807 | 0 | 100% |
| 7 | www.sa****.ru | 44 | 0 | 0 | 3 | 0 | 0 | 41 | 0 | 0 | 100% |
| ... | | | | | | | | | | | |
| 36 | K*nC *. * * | 6,432 | 14 | 124 | 1 | 0 | 0 | 6,431 | 0 | 0 | 100% |
| | Total | 2,704,674 | 942,475 | 797,023 | 138 | 111 | 221 | 2,704,536 | 942,364 | 796,802 | 100% |

FIG. 16

|   | Event name | Number of total security events | | | Number of total security events | | | Number of total security events | | | Accuracy |
|---|---|---|---|---|---|---|---|---|---|---|---|
|   |   | 2013 | 2014 | 2015 | 2013 | 2014 | 2015 | 2013 | 2014 | 2015 |   |
| 1 | ma**-*** | 5,232 | 6,612 | 3,553 | 201 | 216 | 545 | 5,031 | 6,396 | 3,008 | 100% |
| 2 | iframe(**7890) | 19 | 2 | 2 | 3 | 0 | 0 | 16 | 2 | 2 | 100% |
| 3 | pi*****(MZ) | 1 | 0 | 0 | 1 | 0 | 0 | 0 | 0 | 0 | 100% |
| 4 | t******(exe) | 2,033 | 1,846 | 1,223 | 1 | 0 | 0 | 2,032 | 1,846 | 1,223 | 100% |
| 5 | RAT(t******) | 0 | 27,924 | 4,873 | 0 | 3 | 0 | 0 | 27,921 | 4,873 | 100% |
|   | Total | 7,285 | 36,381 | 9,631 | 206 | 219 | 545 | 7,079 | 36,165 | 9,106 | 100% |

FIG. 17

|   | Event name | Number of total security events | | | Number of total security events | | | Number of total security events | | | Accuracy |
|---|---|---|---|---|---|---|---|---|---|---|---|
|   |   | 2013 | 2014 | 2015 | 2013 | 2014 | 2015 | 2013 | 2014 | 2015 |   |
| 1 | g*t-sub*e | 54,790 | 3,886 | 603 | 96 | 19 | 0 | 54,694 | 3,867 | 603 | 100% |
| 2 | G***t3.7 | 2,747 | 141 | 8 | 17 | 3 | 0 | 2,730 | 138 | 0 | 100% |
| 3 | ddos-tool(su******us) | 3,339 | 16,787 | 840 | 59 | 0 | 1 | 3,280 | 16,787 | 839 | 100% |
| 4 | tro***-cn-g***t | 46,922 | 33,673 | 7,136 | 56 | 12 | 5 | 46,866 | 33,661 | 7,131 | 100% |
| 5 | h***th | 19,947 | 473,905 | 11,951,096 | 25 | 10 | 2 | 19,922 | 473,895 | 11,951,091 | 100% |
| 6 | Da*****et 5.3.1 | 187 | 265 | 41 | 11 | 13 | 1 | 176 | 252 | 40 | 100% |
| 7 | Gu*ot(A) | 1,676 | 831 | 264 | 9 | 6 | 6 | 1,667 | 825 | 258 | 100% |
|   | ... |   |   |   |   |   |   |   |   |   |   |
| 51 | Bit******ner | 0 | 17,061,447 | 1,897,895 | 0 | 10 | 12 | 0 | 17,061,437 | 1,897,883 | 100% |
| 52 | PA****T | 0 | 14 | 0 | 0 | 4 | 0 | 0 | 10 | 0 | 100% |
|   | Total | 1,411,259 | 18,492,488 | 14,810,746 | 504 | 131 | 337 | 1,410,755 | 18,492,357 | 14,810,409 | 100% |

FIG. 18

|   | Event name | Number of total security events | | | Number of total security events | | | Number of total security events | | | Accuracy |
|---|---|---|---|---|---|---|---|---|---|---|---|
|   |   | 2013 | 2014 | 2015 | 2013 | 2014 | 2015 | 2013 | 2014 | 2015 |   |
| 1 | D*5 | 22,528 | 4,304 | 8,479 | 1,030 | 446 | 23 | 21,498 | 3,858 | 8,456 | 100% |
| 2 | F****w | 3,090 | 770 | 445 | 151 | 5 | 2 | 2,939 | 765 | 443 | 100% |
| 3 | A***info() | 1,483 | 661 | 125 | 74 | 12 | 0 | 1,409 | 649 | 125 | 100% |
| 4 | RTA(ca******1.2) | 167 | 237 | 6,993 | 8 | 0 | 0 | 159 | 237 | 6,993 | 100% |
| 5 | do****t | 556 | 24 | 3 | 4 | 0 | 0 | 552 | 24 | 3 | 100% |
| 6 | su****us-net* | 1,146 | 358 | 216 | 3 | 0 | 0 | 1,143 | 358 | 216 | 100% |
| 7 | u**d(file) | 225 | 193 | 83 | 3 | 2 | 0 | 222 | 191 | 83 | 100% |
| 8 | URL(www.g*****a.co.kr) | 246 | 0 | 0 | 2 | 0 | 0 | 244 | 0 | 0 | 100% |
| 9 | da******.bot | 1 | 0 | 24 | 1 | 0 | 0 | 0 | 0 | 24 | 100% |
| 10 | fta.go*****n | 13,101 | 153 | 0 | 1 | 0 | 0 | 13,100 | 153 | 0 | 100% |
| 11 | port(5****)) | 0 | 19 | 0 | 0 | 3 | 0 | 0 | 16 | 0 | 100% |
| 12 | do*****.co.kr | 0 | 61 | 0 | 0 | 1 | 0 | 0 | 60 | 0 | 100% |
| 13 | port(1**3)) | 0 | 93 | 365 | 0 | 1 | 4 | 0 | 92 | 361 | 100% |
| 14 | z***.k***f.com | 0 | 483 | 23 | 0 | 1 | 0 | 0 | 482 | 23 | 100% |
|   | Total | 42,543 | 7,356 | 16,756 | 1,277 | 471 | 29 | 41,266 | 6,885 | 16,727 | 100% |

FIG. 19

|   | Event name | Number of total security events | | | Number of total security events | | | Number of total security events | | | Accuracy |
|---|---|---|---|---|---|---|---|---|---|---|---|
|   |   | 2013 | 2014 | 2015 | 2013 | 2014 | 2015 | 2013 | 2014 | 2015 |   |
| 1 | file(up****) | 79,186 | 571,698 | 676,223 | 5 | 3 | 3 | 79,181 | 571,695 | 676,220 | 100% |
| 2 | Su****us(D**) | 4 | 509,765 | 8,450,237 | 4 | 4 | 1 | 0 | 509,761 | 8,450,236 | 100% |
| 3 | po**-net**** | 15 | 24 | 22 | 2 | 1 | 0 | 13 | 23 | 22 | 100% |
| 4 | j** FiLE Br***** | 157 | 433 | 969 | 2 | 5 | 4 | 155 | 428 | 965 | 100% |
| 5 | Da****(file*****) | 0 | 326 | 632 | 0 | 12 | 34 | 0 | 314 | 598 | 100% |
| 6 | web*****(top****t) | 27 | 1 | 11 | 1 | 1 | 0 | 26 | 0 | 11 | 100% |
| 7 | web*****(php_***) | 492 | 28,251 | 53,516 | 0 | 1 | 2 | 492 | 28,250 | 53,514 | 100% |
|   | ... | | | | | | | | | | |
| 20 | web*****(W**2.1) | 0 | 5 | 0 | 0 | 1 | 0 | 0 | 4 | 0 | 100% |
| 21 | attack(u****) | 0 | 1,307 | 0 | 0 | 1 | 0 | 0 | 1,306 | 0 | 100% |
|   | Total | 88,414 | 1,222,146 | 28,795,133 | 22 | 37 | 54 | 88,392 | 1,222,109 | 28,795,079 | 100% |

FIG. 20

| | Event name | Number of true positives | period | Accuracy |
|---|---|---|---|---|
| 1 | TCP syn flooding | 13 | 2014.01.01~2014.10.20 | 99% |
| 2 | TCP service scan | 3 | 2014.01.01~2014.10.20 | 100% |
| 3 | UDP flooding fragmented | 4 | 2014.01.01~2014.10.20 | 99% |
| 4 | TCP null scan | 11 | 2009.01.01~2011.12.31 | 100% |
| 5 | UDP port scan | 182 | 2009.01.01~2011.12.31 | 100% |
| 6 | UDP flooding same IP | 2 | 2014.01.01~2014.10.20 | 100% |
| | Total | 215 | | |

METHOD AND DEVICE FOR AUTOMATICALLY VERIFYING SECURITY EVENT

CROSS-REFERENCE TO RELATED APPLICATIONS

This application is the National Stage filing under 35 U.S.C. 371 of International Application No. PCT/KR2016/001512, filed on Feb. 15, 2016, which claims the benefit of U.S. Provisional Patent Application No. 62/243,143, filed on Oct. 19, 2015, the contents of which are all hereby incorporated by reference herein in their entirety.

TECHNICAL FIELD

The present invention relates to a method of automatically verifying a security event and an apparatus therefor.

BACKGROUND ART

Although various researches for enhancing efficiency in detecting a mass security event and performing an analytic work have been performed at home and abroad, most of the researches focused on identifying a trend of a cyber threat and an indirect approach (statistical analysis, visualizing, etc.) for reducing the number of security events becoming targets of analysis using basic information (IP, port, protocol, event name, etc.) on a security event only. As a result, since it was difficult to determine whether or not an actual hacking attack occurs on a security event, it was necessary to perform additional analysis when a security control operation is performed.

According to the previous researches, a data mining technology and a machine learning technology are mainly applied to automatically verifying a mass security event. Yet, this approach has a fundamental problem that accuracy is low. However, in case of a cyber hacking attack, since detection accuracy and analysis accuracy are very important, it is difficult to practically apply the technologies to a cyber security center.

Currently, large amounts of security events are triggered in accordance with the increase of a consistent cyber threat attempt. According to the domestic security control system, a security event triggered by a detection rule-based security equipment (IDS/IPS, TMS, etc.) depends on manual analysis and experience of a security control personnel. Moreover, when a security control result is induced, a phenomenon that an analysis is leaning to a specific type is occurring.

Currently, a government led centralized security control system shares a detection pattern for detecting a cyber hacking attack and focuses on constructing an international and unitary hacking incident cooperation system that promptly detects an attack and responds to the attack based on the detection pattern. However, the pattern-based security control system may have a critical point shown in the drawing. Currently, a security event triggered by a detection pattern is explosively and consistently increasing according to the rapidly increasing cyber threat. However, it is realistically impossible for a security control personnel to analyze all security events to determine whether or not a corresponding security event is actually attacked. For example, since it is necessary for a security personnel to analyze hundreds, even thousands of security events per minute, immediacy and accuracy of security control are degraded. And, since a current security control work completely depends on expertise and/or experience of the security personnel, a work bias phenomenon concentrating on an analysis of a specific security event only may occur. Hence, there is a lack of reaction capability for a new unknown hacking attack technique.

According to the legacy detection pattern-based security control, since the security control is performed based on a detection pattern, a new type attack or a mutated type attack bypassing the detection pattern increases and it is unable to respond to a known attack which has no detection pattern. Moreover, if the security control is performed based on a text, detection workload and/or analysis workload according to the rapid increase of cyber threat increases and it is difficult to intuitively recognize a mass cyber-attack. Moreover, if the security control is performed by human, it may spend too much time in analyzing a frequently appearing cyber threat and a previously appeared cyber-attack only. Hence, a difference may exist in service quality according to a personal analysis level.

DISCLOSURE OF THE INVENTION

Technical Tasks

A technical task of the present invention is to provide a method of extracting a characteristic of a security event detected by a detection rule-based security equipment (IDS/IPS, TMS, etc.).

Another technical task of the present invention is to provide a method of classifying security events detected by a detection rule-based security equipment (IDS/IPS, TMS, etc.) according to an attack type.

The other technical task of the present invention is to provide a method of automatically verifying a security event by applying an algorithm according to each attack type to the security event.

Technical Solution

According to the purpose of the present invention, as schematically described in the present invention, the present invention proposes a method of automatically verifying whether or not security events detected by an attack of a detection rule-based security equipment (IDS/IPS, TMS, etc.) correspond to a true positive (a security event triggered by an actual attack).

Advantageous Effects

According to one embodiment the present invention, it is able to maximize efficiency of a security equipment by automatically verifying a security event detected by a security equipment detection rule-based security equipment (IDS/IPS, TMS, etc.) and recognizing the security event as a true positive (a security event triggered by an actual attack) and a false positive (a security event triggered by normal communication).

According to a method of automatically verifying a security event and an apparatus according to one embodiment of the present invention, it is able to respond to a new attack or a mutated attack bypassing a detection pattern and a known attack which has no detection pattern.

According to a method of automatically verifying a security event and an apparatus according to one embodiment of the present invention, it is able to intuitively recognize a mass cyber-attack.

According to a method of automatically verifying a security event and an apparatus according to one embodiment of the present invention, it is able to provide an automatic verification result of a high level by applying an algorithm according to each attack type to a security event.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 3 is a diagram for basic information according to one embodiment of the present invention;

FIG. 4 is a diagram for a list of character strings corresponding to true positive according to an attack type in accordance with one embodiment of the present invention;

FIG. 5 is a diagram for explaining static components and dynamic components according to one embodiment of the present invention;

FIG. 14 is a diagram for statistic of detection rules (signature rules) according to one embodiment of the present invention;

FIG. 15 is a diagram for accuracy of an automatic verification method according to a malicious URL type in accordance with one embodiment of the present invention;

FIG. 16 is a diagram for accuracy of an automatic verification method according to a malware download type in accordance with one embodiment of the present invention;

FIG. 17 is a diagram for accuracy of an automatic verification method according to a malware infection type in accordance with one embodiment of the present invention;

FIG. 18 is a diagram for accuracy of an automatic verification method according to an information transmission type in accordance with one embodiment of the present invention;

FIG. 19 is a diagram for accuracy of an automatic verification method according to a file upload type in accordance with one embodiment of the present invention;

FIG. 20 is a diagram for accuracy of an automatic verification method for a threshold-based security event according to one embodiment of the present invention;

BEST MODE

Reference will now be made in detail to the preferred embodiments of the present invention, examples of which are illustrated in the accompanying drawings. Yet, the present invention is not limited or restricted by the embodiments of the present invention.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 1:
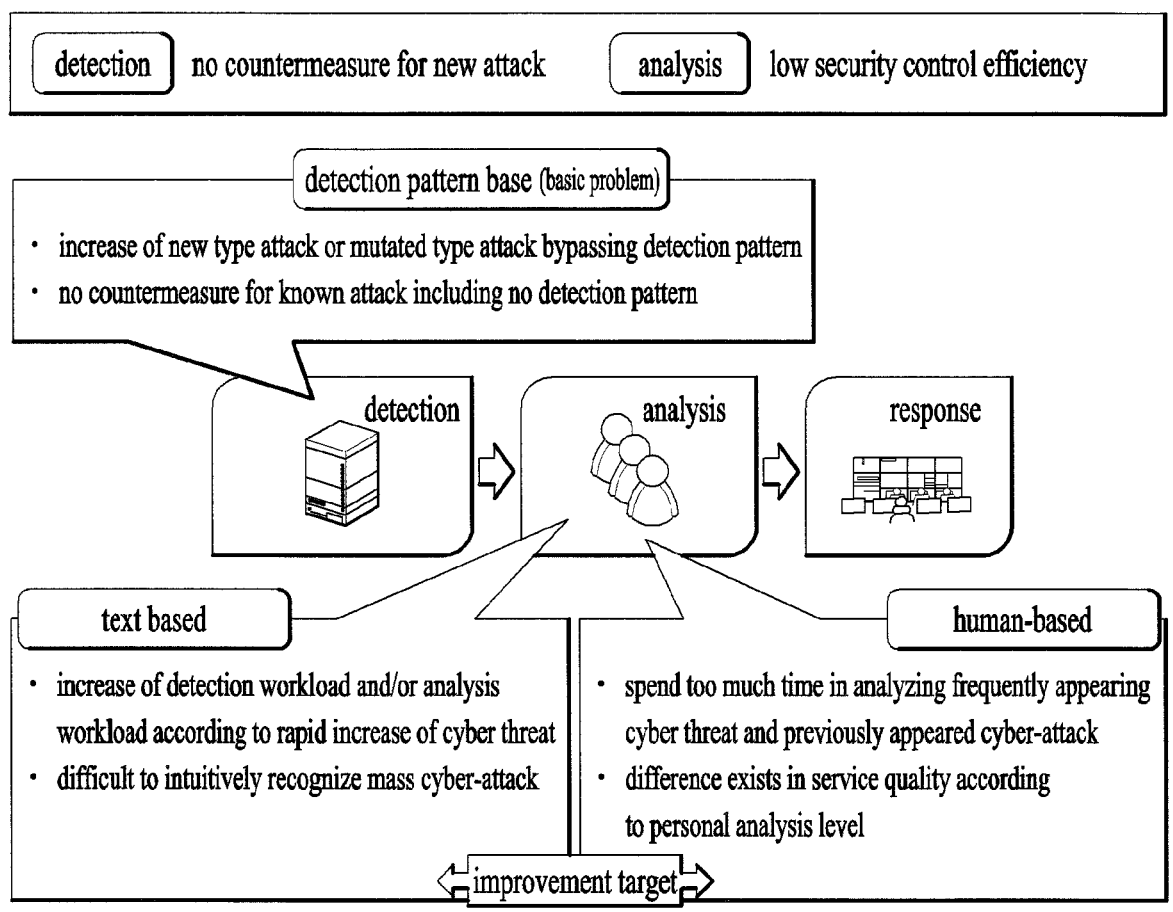
FIG. 1 is a diagram for a legacy detection pattern-based security control according to one embodiment of the present invention.

FIG. 1 is a diagram for a legacy detection pattern-based security control according to one embodiment of the present invention.

According to one embodiment of the present invention, a government led centralized security control system shares a detection pattern for detecting a cyber hacking attack and focuses on constructing an international and unitary hacking incident cooperation system that promptly detects an attack and responds to the attack based on the detection pattern. However, the pattern-based security control system may have a critical point shown in the drawing. According to one embodiment of the present invention, currently, a security event triggered by a detection pattern is explosively and consistently increasing according to the rapidly increasing cyber threat. However, it is realistically impossible for a security control personnel to analyze all security events to determine whether or not a corresponding security event is actually attacked. For example, since it is necessary for a security control personnel to analyze hundreds, even thousands of security events per minute, immediacy and accuracy of security control are degraded. And, since a current security control work completely depends on expertise and/or experience of the security personnel, a work bias phenomenon concentrating on an analysis of a specific security event only may occur. Hence, there is a lack of reaction capability for a new unknown hacking attack technique.

According to the legacy detection pattern-based security control, since the security control is performed based on a detection pattern, a new type attack or a mutated type attack bypassing the detection pattern increases and it is unable to respond to a known attack which has no detection pattern. Moreover, if the security control is performed based on a text, detection workload and/or analysis workload according to the rapid increase of cyber threat increases and it is difficult to intuitively recognize a mass cyber-attack. Moreover, if the security control is performed by human, it may spend too much time in analyzing a frequently appearing cyber threat and a previously appeared cyber-attack only. Hence, a difference may exist in service quality according to a personal analysis level.

Hence, the present invention proposes a security event automatic verification equipment capable of promptly and precisely determining an actual attack and/or a damage via automatic analysis for a mass security event and the security event automatic verification equipment capable of performing static and/or dynamic analysis-based security event automatic verification for performing next generation security control and infringement response.

The security event automatic verification equipment according to one embodiment of the present invention can reinforce capability capable of responding to a total periodic infringement accident via a next generation security control technique and provide environment where a user using a core research information resource is able to safely perform research. Moreover, the security event automatic verification equipment according to one embodiment of the present invention can contribute to the public interests by disseminating a core technique and know-how for constructing and/or managing a developed security control infra to a control center of a different field. And, it may be able to completely block the leakage of a core research material using a source technology for detecting a new hacking attack, a mutated hacking attack, and a mass hacking attack. By doing so, it may be able to minimize economic loss and/or contribute to the enhancement of national competitiveness.

The security event automatic verification equipment according to one embodiment of the present invention can perform a national security control and/or an infringement response system by shaping and/or automating hacking attack detection and/or analysis know-how of a security control personnel to switch from a legacy human-based security control to a system-based security control.

The security event automatic verification equipment according to one embodiment of the present invention can provide a threshold-based security event automatic verification technique. More specifically, it may statistically analyze and classify features of security events, which are handled based on a threshold, by utilizing an infringement threat management system (TMS) constructed and/or managed by a science-technology cyber security center (S&T-SEC) to determine whether a security event detection result corresponds to a true positive or a false positive. By doing so, it may be able to automatically verify a security event.

A security event automatic verification equipment according to a different embodiment of the present invention can provide a security event automatic verification technique according to an attack type. More specifically, the security event automatic verification equipment can automatically verify a security event by utilizing a type example of cyber-attack (malicious URL, malware download, malware infection, information transmission, and file upload) and dynamic feature information.

Figure 2:
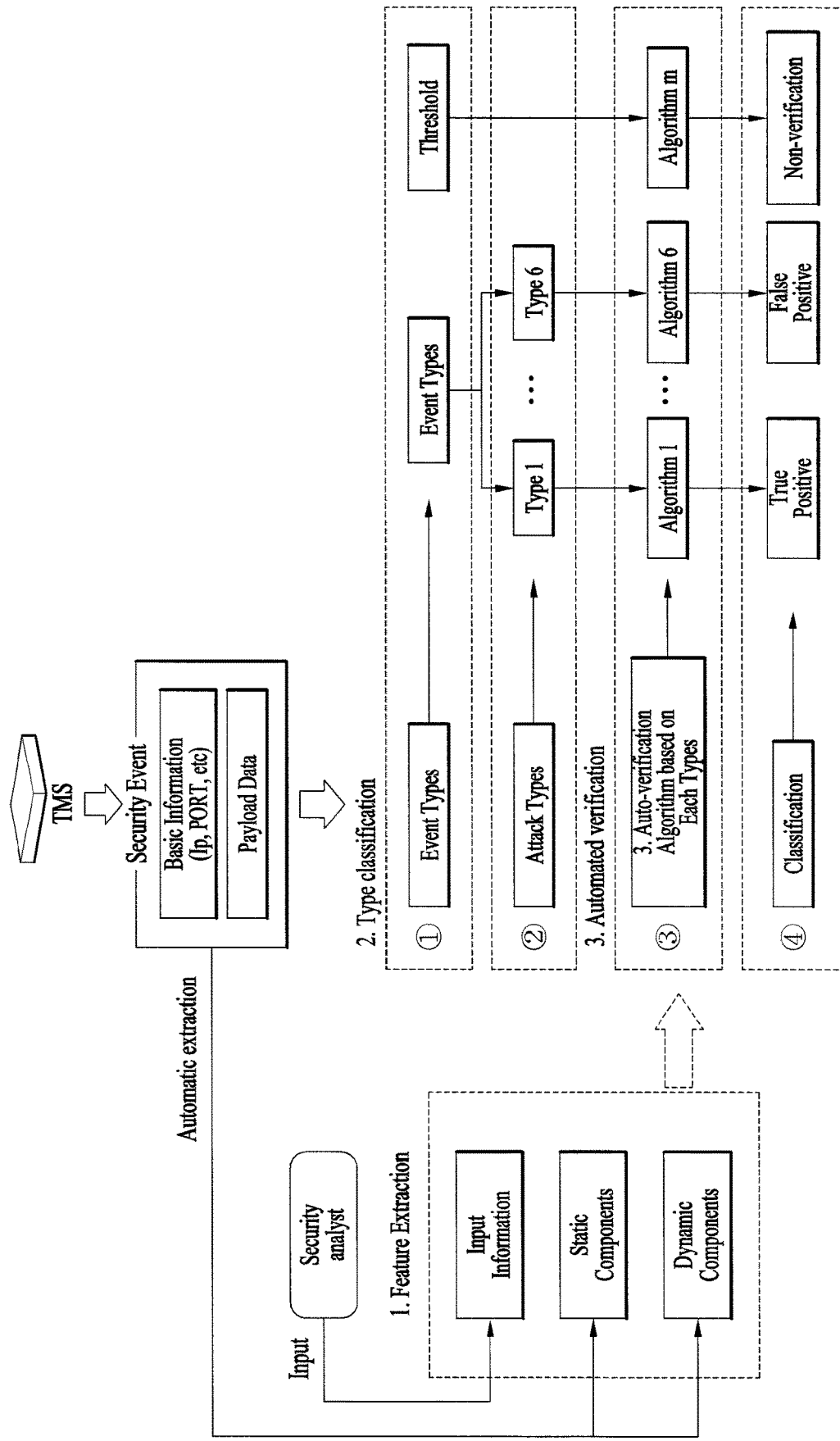
FIG. 2 is a diagram for a mass security event automatic verification structure of a security event automatic verification equipment according to one embodiment of the present invention.

FIG. 2 is a diagram for a mass security event automatic verification structure of a security event automatic verification equipment according to one embodiment of the present invention.

An overall structure of a mass security event automatic verification method of a security event automatic verification equipment according to one embodiment of the present invention is shown in FIG. 2. The security event automatic verification equipment according to one embodiment of the present invention can include a feature extraction module, a type classification module, and/or an automated verification module to automatically verify a mass security event.

The feature extraction module according to one embodiment of the present invention can extract features for automatically verify a security event in an automated verification step. According to one embodiment of the present invention, the features extracted in the automated verification step can include basic information, a static item, and a dynamic item. According to one embodiment of the present invention, the basic information may correspond to information inputted by a security control personnel (user). According to one embodiment of the present invention, the static item may correspond to an item used for static verification that performs comparison with information included in a security event. According to one embodiment of the present invention, the dynamic item may correspond to an item used for dynamic verification that performs a confirmation result of accessing an external system. In this case, the basic information and input information can be used as the same meaning.

The type classification module according to one embodiment of the present invention can classify security events into a signature-based security event and a threshold-based security event.

According to one embodiment of the present invention, the signature-based security event can be defined as a security event triggered by a packet including a character string identical to a predefined character string pattern (a combination of alphabetical character/number/special symbol or regular expressions). The threshold-based security event corresponds to a security event, which is triggered when a specific packet exceeds a predefined threshold (occurrence frequency per unit time).

And, the type classification module can classify signature-based security event into 5 attack types based on attack features to verify security events according to each attack type in the automated verification step.

According to one embodiment of the present invention, the automated verification module receives an input of features extracted in the feature extraction step and can verify a signature-based security event, which is classified according to an attack type, and a threshold-based security event using an automatic verification algorithm configured based on each attack type. As shown in the drawing, a verification result may correspond to one selected from the group consisting of true positive, false positive, and non-verification.

According to one embodiment of the present invention, each of the feature extraction module, the type classification module, and/or the automated verification module may correspond to a processor corresponding to hardware for performing an independent function.

FIG. 3 is a diagram for basic information according to one embodiment of the present invention.

The security event automatic verification equipment according to one embodiment of the present invention can extract basic information, static components, and/or dynamic components to automatically verify security events.

The basic information according to one embodiment of the present invention corresponds to user-inputted information necessary for automatic verification and can include information on an institute related to a security event, domain information, and the like. As mentioned in the foregoing description, the automated verification module according to one embodiment of the present invention can compare the basic information with the static components and/or the dynamic components when a security event is verified. The present drawing shows a table indicating items included in the basic information according to one embodiment of the present invention and description of the items. In the following, each of the items is explained.

According to one embodiment of the present invention, the basic information can include essential items and/or additional items. The essential items correspond to items essential for performing automatic verification. The additional items correspond to items helpful for enhancing accuracy of automatic verification. The essential items can include an institute IP list. The additional items can include a black IP list, a white IP list, a black FQDN (fully qualified domain name) list, a white FQDN list, and/or a character string list for the five attack types.

According to one embodiment of the present invention, the institute IP list includes IP addresses of institutes that receive a security monitoring service. According to one embodiment of the present invention, if the institute IP list does not exist, automatic verification may not be performed. The black IP list generally includes a malicious IP address used for attack. The white IP list includes main portal sites or a reliable IP address such as a cloud service. According to one embodiment of the present invention, the black FQDN list and the white FQDN list include a domain name requested by an internet user. The black FQDN list includes a host name used for attack and the white FQDN list includes a reliable host name. When a victim is under attack, the character string list for the five attack types includes a value included in a payload of a packet transmitted to an aggressor. For example, when a victim sends system information to an aggressor, the character string may correspond to a value related to a mac address, OS information, and the like. According to one embodiment of the present invention, character strings related to an attack corresponding to a true positive can be classified according to a type of a security event.

According to one embodiment of the present invention, the basic information can also be referred to as user basic information. The essential item and the additional item can also be referred to as essential information and additional information, respectively.

FIG. 4 is a diagram for a list of character strings corresponding to true positive according to an attack type in accordance with one embodiment of the present invention.

Referring to FIG. 4, according to one embodiment of the present invention, if an attack type corresponds to information transmission, such a character string as mac=, os=, register, avs=, ver=, pwd=, ie=, MB, provider, machine, npki, uid=, cpuname=, username=, WolfDDos, # information, prj=, logdata=, Windows, ADDNEW, MHz, uin=, nickname, ip, name, mobile, or the like corresponds to a true positive. If an attack type corresponds to a malicious URL, such a character string as USER, PORT, CWD, PASS, NICK, /ttt/sty.htm, user-agent: wget, or the like corresponds to a true positive. If an attack type corresponds to malware infection, such a character string as Gh0st, X.C . . . , x.Kc" . . . , o.b.j.e.c.t, t.a.b.l.e, &&&&&, filepath=, filename=, RooKIE, or the like corresponds to a true positive. If an attack type corresponds to file upload, such a character string as EasyPhpWebShell, zecmd, idssvc, iesvc, Action=MainMenu, Action=ScanPort, JspSpy Ver, Not Found Shell, .asp.jpg, .php.jpg, 200 OK, or the like corresponds to a true positive.

FIG. 5 is a diagram for explaining static components and dynamic components according to one embodiment of the present invention.

In the following, a static component for static verification performed in an automated verification step is explained according to one embodiment of the present invention. The static component according to one embodiment of the present invention corresponds to basic information capable of being extracted from a security event. The static component can be used to statically verify a security event detected by TMS to find out a true positive or filter a false positive of a security event. FIG. 5 shows a static component and a dynamic component. The static component includes a source IP, a destination IP, a source port, a destination port, a host, payload, HTTP referrer, and/or the number of security events. When the static verification is performed, most of static components can be used for comparing with basic information except several components.

According to one embodiment of the present invention, the source IP and the destination IP correspond to very basic information for verifying a security event. According to one embodiment of the present invention, the source IP and the destination IP can be analyzed in a manner of being compared with an institution IP list, a black IP list, and/or a white IP list among the basic information. A security event automatic verification equipment according to one embodiment of the present invention can check whether or not the source IP and/or the destination IP belongs to an IP address of the aforementioned 3 IP lists inputted by a security control personnel. The security event automatic verification equipment according to one embodiment of the present invention can find out a source IP and/or a destination IP of a security event corresponding to an institution IP list to identify an aggressor and a victim. Moreover, the security event automatic verification equipment according to one embodiment of the present invention can check whether or not the source IP and/or the destination IP is matched with a back IP or a white IP. According to one embodiment of the present invention, if the source IP or the destination IP is matched with the black IP, a corresponding security event can be recognized as a suspicious system. On the contrary, if the source IP or the destination IP is matched with the white IP, a corresponding security event can be recognized as having an IP address for providing a normal service (e.g., internet portal, major cloud system, etc.). Moreover, the security event automatic verification equipment according to one embodiment of the present invention can compare the source IP and/or the destination IP with a darknet IP corresponding to a set of unused IP addresses. This is because sensing a packet via a darknet is not performed for a normal activity. The security event automatic verification equipment according to one embodiment of the present invention defines a source port and a destination port as a part of static components capable of being used for distinguishing an actual attack from a false positive of IDS notification. This is because, when aggressors access a target of attack, the aggressors generally use a well-known port number. A host according to one embodiment of the present invention corresponds to a domain name requested by an internet user. The security event automatic verification equipment according to one embodiment of the present invention verifies whether or not a detected security event requests a connection with black FQDN or white FQDN to identify a normal connection and a malicious connection using host information. The payload according to one embodiment of the present invention corresponds to data belonging to a packet of a security event. The security event automatic verification equipment according to one embodiment of the present invention may check a character string belonging to a payload of a packet of a security event to compare the character string belonging to the payload of the packet of the security event with an actual attack or a character string associated with a normal signal. Detail explanation on the character string has been explained in the foregoing description. The HTTP referrer according to one embodiment of the present invention corresponds to the last page immediately before a user clicks a hyperlink for a destination webpage. The security event automatic verification equipment according to one embodiment of the present invention can identify whether or not the HTTP referrer exists in a packet of a security event. In particular, the security event automatic verification equipment can check where the HTTP traffic is requested. According to one embodiment of the present invention, the number of security events caused by a specific source IP address can be used for comparing with a threshold when malware download and malware infection are analyzed. According to one embodiment of the present invention, the number of security events having the same source IP and the destination IP indicate real time information. This is because the automatic verification equipment according to one embodiment of the present invention processes a security event in real time. Hence, in case of a malware download type, if the number of security events, which is detected within 1 to 5 minutes, having the same source IP and the destination IP is greater than a threshold, the automatic verification equipment considers an activity related to file download as being repeatedly failed and considers a corresponding security event as an access related to a malicious file. Moreover, in case of a malware infection type, if the number of security events, which is detected within 24 hours, having the same source IP and the destination IP is greater than a threshold, the automatic verification equipment may consider it as a malware infected PC repeatedly transmits an infection signal to a command server or a malicious server.

In order to perform dynamic verification, the security event automatic verification equipment according to one embodiment of the present invention can extract a dynamic component necessary for checking access to an external system. According to one embodiment of the present invention, the dynamic component can include a host and GET URL (Host URL), Get URL, a website source code, and/or a destination port. A static component corresponds to basic information extracted from a security event, whereas the dynamic component corresponds to actual information associated with an external system or a service. Hence, in order to discover an actual attack, the security event automatic verification equipment according to one embodiment of the present invention may access an extracted URL or perform dynamic activities to analyze each component of the dynamic components extracted from a security event. The host and GET URL and/or the Get URL according to one embodiment of the present invention can be extracted from a payload of a security event. Since the security event automatic verification equipment according to one embodiment of the present invention is able to identify actual attacks of a security event by accessing a corresponding URL, the host and GET URL and/or the Get URL can be used as a verification component. The website source code according to one embodiment of the present invention corresponds to a source code within a website requested by a user. The security event automatic verification equipment according to one embodiment of the present invention can compare the website source code with a character string inputted by a security control personnel. In this case, the character string corresponds to a character string associated with an actual attack inputted by a security control personnel and a normal signal. According to one embodiment of the present invention, the website source code can include a command for an attack. Hence, the security event automatic verification equipment according to one embodiment of the present invention compares the website source code with the character string inputted by a security control personnel to determine whether or not a corresponding security event corresponds to an actual attack. The destination port according to one embodiment of the present invention can be used for checking whether or not a destination port is opened to check whether or not an attack to a victim matched with a destination IP is successful. If the destination port is opened, since it is able to attack the victim via the opened port, it is highly probable that a corresponding attack is successful.

Figure 6:
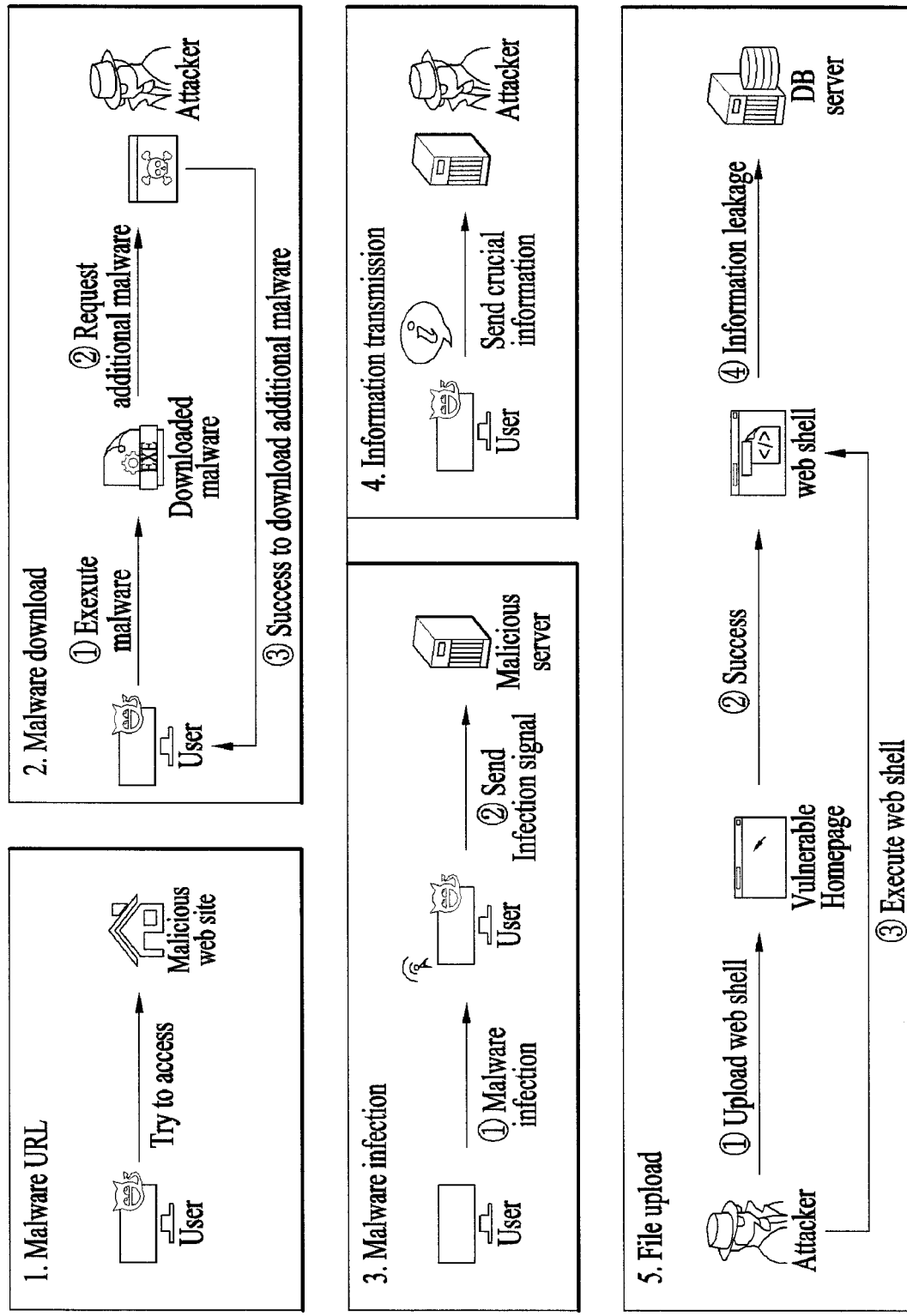
FIG. 6 is a diagram for a feature of an attack type according to one embodiment of the present invention.

FIG. 6 is a diagram for a feature of an attack type according to one embodiment of the present invention.

A type classification module according to one embodiment of the present invention can classify a signature-based security event into 5 attack types based on an attacking feature. FIG. 6 shows each feature of the attack types.

An attack type according to one embodiment of the present invention can include a malicious URL, malware download, malware infection, information transmission, and/or file upload.

According to the malicious URL, a system infected by such a malware as a worm, a virus, and the like may attempt an additional malicious action by accessing a malicious website (URL) constructed by an aggressor.

According to the malware download, a system infected by such a malware as a worm, a virus, and the like may attempt to additionally download a malicious file (.exe, .txt, etc.) from a distribution server constructed by an aggressor.

According to the malware infection, a system infected by such a malware as a worm, a virus, and the like may transmit an infection signal to a system constructed by an aggressor such as a command server, a stopover server, and the like to indicate that the system is infected by a malware.

According to the information transmission, a system infected by such a malware as a worm, a virus, and the like may transmit important information such as information (e.g., OS information, MAC address, PC name, etc.) of the system, personal information (e.g., mail account, address book, etc.) to a system constructed by an aggressor such as a command server, a stopover server, and the like.

According to the file upload, an aggressor attacks a website in which security vulnerability exists and uploads a malicious code (e.g., web shell) to the website to perform a malicious activity such as important information leakage from a corresponding web server, capturing access right, and the like. And, an aggressor can execute the malicious code (e.g., web shell).

According to one embodiment of the present invention, the malicious URL type can also be referred to as a specific URL access type. The malware download type can also be referred to as an information leakage type. The malware infection type can also be referred to as a DDoS attack type, a zombie PC type, or an infection signal transmission type. The file upload type can also be referred to as a homepage attack type or an access right capturing type. Moreover, a security event according to one embodiment of the present invention may have such an attack type as a signal transmission/reception feature type and/or a hacking stopover type as well as the aforementioned attack type.

Figure 7:
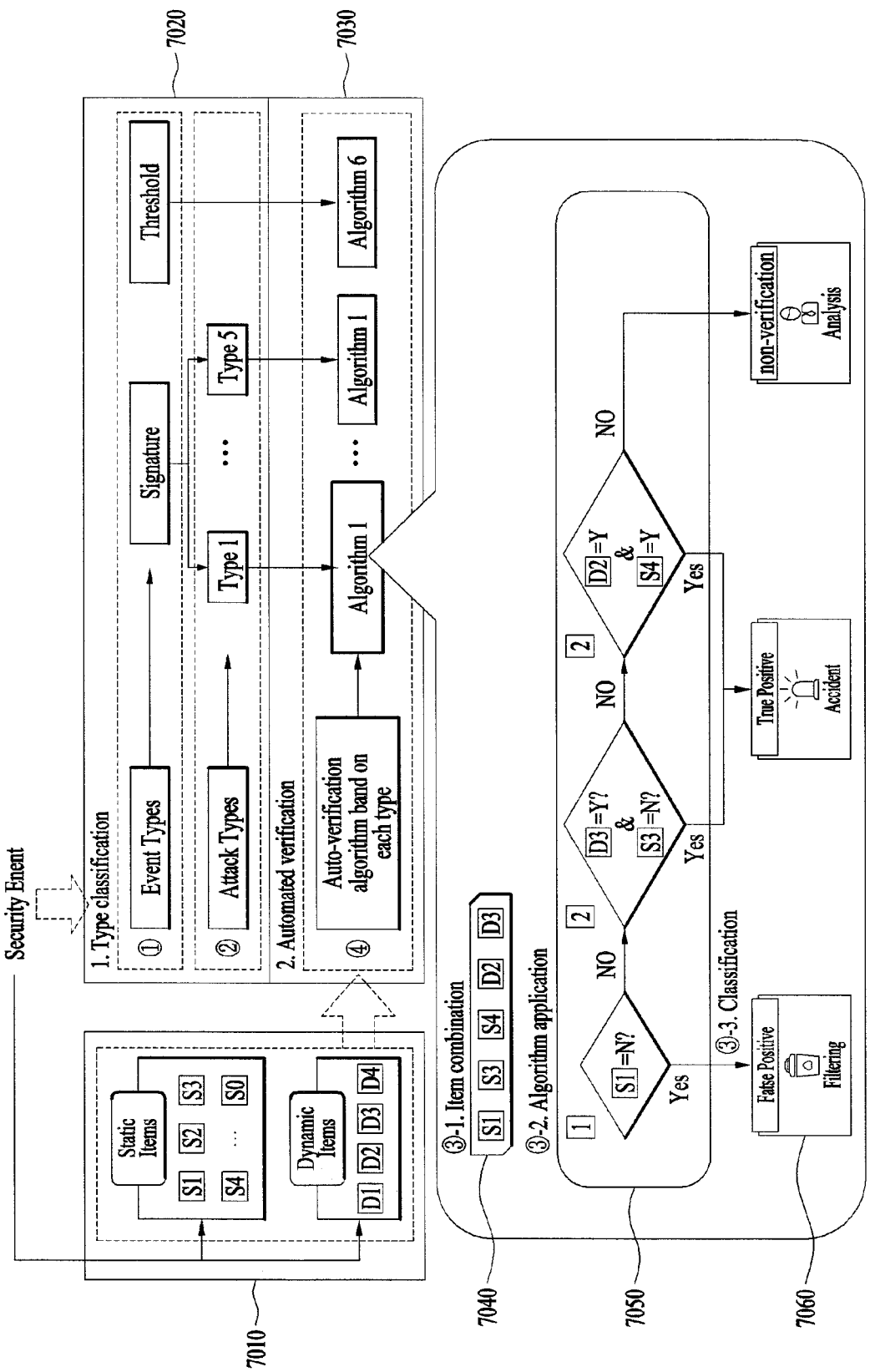
FIG. 7 is a diagram for an overall process of an automatic verification method according to one embodiment of the present invention.

FIG. 7 is a diagram for an overall process of an automatic verification method according to one embodiment of the present invention.

The security event automatic verification equipment according to one embodiment of the present invention can provide an automatic verification method of a security event. FIG. 7 shows an overall process of the automatic verification method proposed in the present invention. As mentioned in the foregoing description, a security event according to one embodiment of the present invention can be classified into a signature-based security event and a threshold-based security event. The signature-based security event can be classified into 5 attack types and the automated verification of security events can be performed by applying a verification algorithm based on the attack types. The automatic verification method according to one embodiment of the present invention can include a feature extraction step S7010, a type classification step S7020, and/or an automatic verification step S7030. And, according to one embodiment of the present invention, the automatic verification step S7030 can include an item combination step S7040, an algorithm application step S7050, and/or a classification step S7060. In the item combination step, the security event automatic verification equipment according to one embodiment of the present invention can combine static components and dynamic components, which are extracted from a security event, with each other to perform each step of an algorithm. In the algorithm application step, the security event automatic verification equipment according to one embodiment of the present invention applies an algorithm belonging to an attack type of a security event and may be then able to verify each step of the algorithm. In the classification step, the security event automatic verification equipment according to one embodiment of the present invention can classify security events according to a verification result of the applied algorithm. A classification result can include a true positive, a false positive, and/or non-verification. In this case, the true positive corresponds to an actual attack and the false positive may indicate that a corresponding security event is caused by normal communication. According to one embodiment of the present invention, security events classified into the true positive or the false positive can be automatically processed or filtered without an additional analysis. Yet, if the security events are classified into non-verification, a security control personnel can perform additional analysis on a security event to identify a true positive or a false positive.

According to one embodiment of the present invention, in order to perform automatic verification based on an attack type, 5 attack types were analyzed using the know-how of a security control personnel, a previously processed accident history, and/or related material. As a result, the security event automatic verification equipment according to one embodiment of the present invention extracts features consisting of a combination of static component and dynamic component for each of the 5 attack types, designs an automatic verification algorithm for each type, and provides the algorithm.

Figure 8:
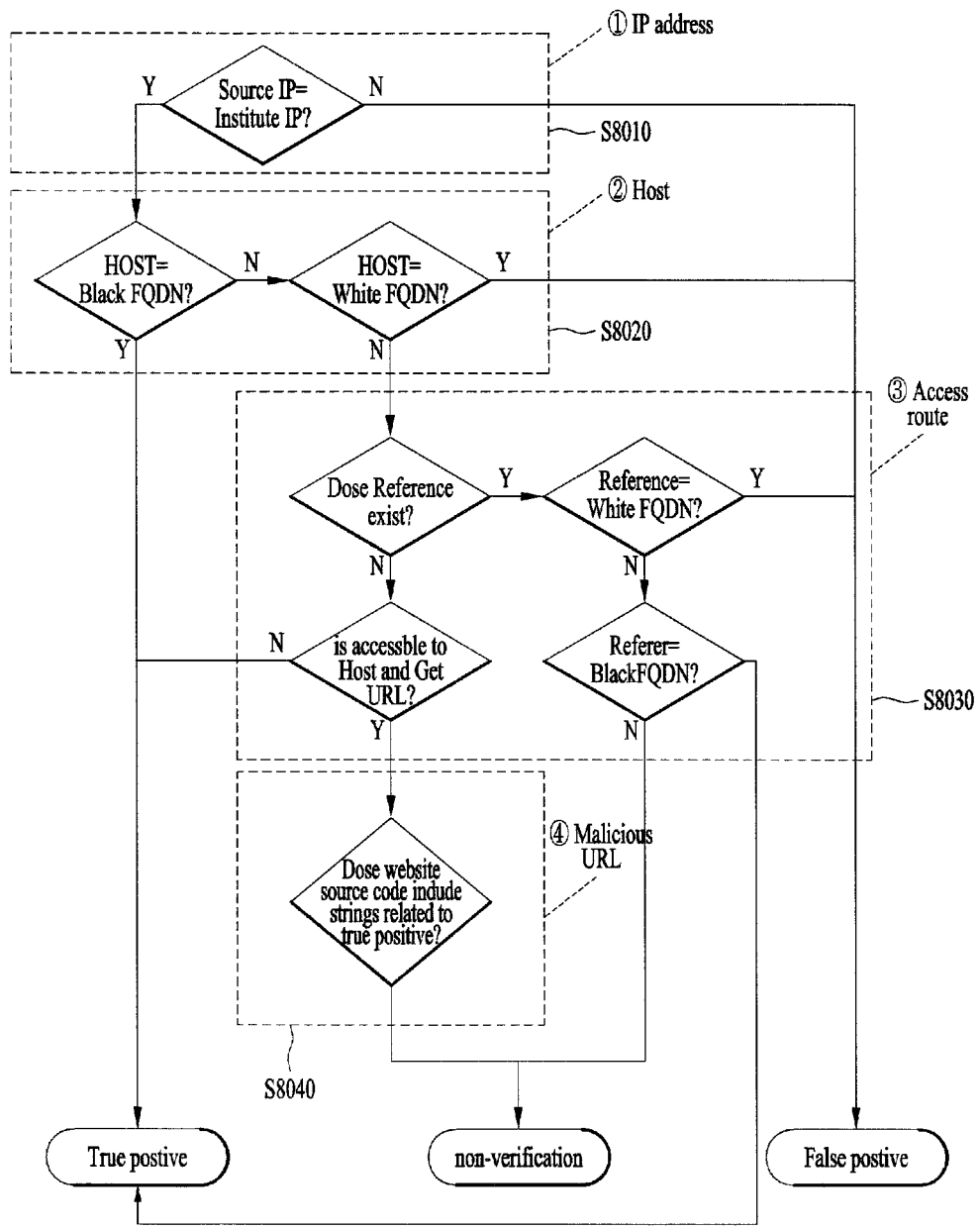
FIG. 8 is a flowchart for an automatic verification algorithm for a malicious URL type according to one embodiment of the present invention.

FIG. 8 is a flowchart for an automatic verification algorithm for a malicious URL type according to one embodiment of the present invention.

According to one embodiment of the present invention, a security event of a malicious URL type can be detected when a system infected by a worm or a virus intends to access a malicious URL. FIG. 8 shows an automatic verification algorithm of a security event belonging to a malicious URL type.

According to one embodiment of the present invention, the automatic verification method for a malicious URL type can include an IP address verification step S8010, a host verification step S8020, an access route verification step S8030, and/or a malicious URL verification step S8040.

In the IP address verification step S8010, an automatic verification module according to one embodiment of the present invention can compare a source IP with an institution IP list to discover an activity that a PC of an institution IP or a system accesses a malicious URL. If the source IP is not matched with the institution IP list, a corresponding security event can be recognized as a false positive. If the source IP is matched with the institution IP list, the automatic verification module can perform a nest step for additional verification.

In the host verification step S8020, the automatic verification module can determine whether a corresponding host corresponds to a black FQDN list or a white FQDN list to verify reliability of the host requested by a user. If a host of a corresponding security event is included in the black FQDN list, the security event can be classified as a true positive group. If a host of a corresponding security event is included in the white FQDN list, the security event can be classified as a false positive group. If a host is not included in both the black FQDN list and the white FQDN list, the automatic verification module can perform a nest step for additional verification.

In the access route verification step S8030, the automatic verification module can verify an external access route to check whether or not a victim really intended to access a malicious URL. The automatic verification module can determine whether or not a referrer exists in a corresponding security event. If the referrer exists in the security event, the automatic verification module can check whether the referrer belongs to a white FQDN list or a black FQDN list. If the referrer belongs to the white FQDN list, the security event can be classified as a false positive group. This is because it can be considered as the security event is detected when a normal website is used. If the referrer belongs to the black FQDN list, the security event can be classified as a true positive group. If the referrer does not belong to both the white FQDN list and the black FQDN list, the security event can be classified as a non-verification group. If the referrer does not exist, the automatic verification module can determine whether or not a host requested by a source IP and GET URL are accessible. If the host and the GET URL exist and the host and the GET URL are accessible, the automatic verification module can perform a next step to check whether or not a victim accesses a webpage estimated as a malicious URL. Yet, if it fails to access the host and the GET URL, the security event can be considered as a true positive. This is because accessing the host and the GET URL, which are unable to provide a normal service, without the referrer can be recognized as a malicious activity.

In the malicious URL verification step S8040, the automatic verification module can determine whether or not a source code of a website of the host and the GET URL includes a specific character string related to a true positive. According to one embodiment of the present invention, HTML codes can be used for generating websites. In particular, the HTML codes can be used for inserting (embedding) images and objects that construct the websites. Aggressors can insert HTML codes such as iframe or frame to a source code of a website to make visitors head towards a malicious website. In order to insert an invisible iframe to a website, the aggressors can configure a height, a width, and a border value of the iframe by 0 or a small value. Hence, the automatic verification module compares character strings of a source code of a website with character strings inputted by a security control personnel to check whether or not a security event corresponds to a true positive.

Figure 9:
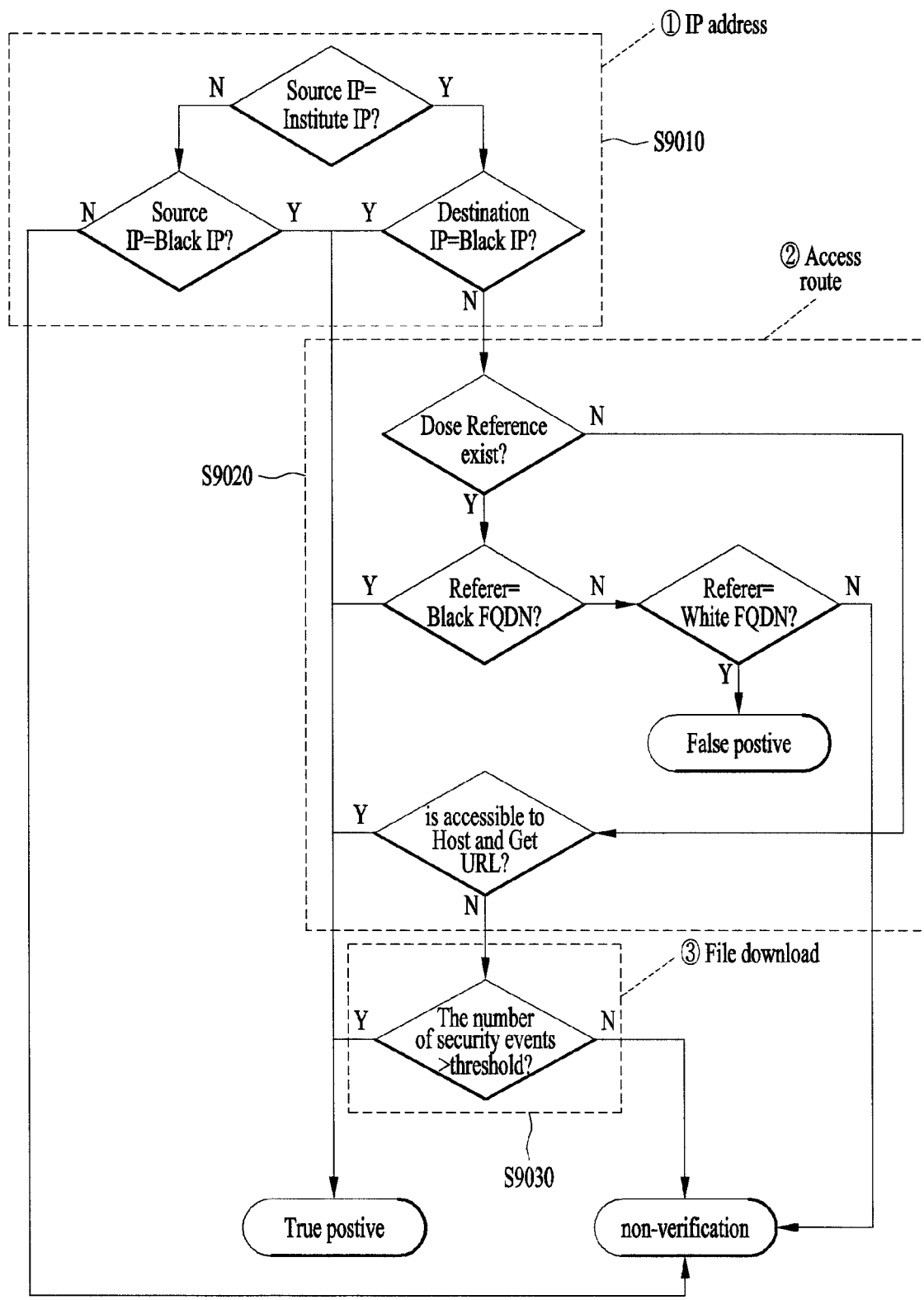
FIG. 9 is a flowchart for an automatic verification algorithm for a malware download type according to one embodiment of the present invention.

FIG. 9 is a flowchart for an automatic verification algorithm for a malware download type according to one embodiment of the present invention.

FIG. 9 shows a verification algorithm of a security event belonging to malware download. A security event of a malware download type can be detected when a system infected by a worm or a virus intends to download malware files by accessing a malicious website.

According to one embodiment of the present invention, an automatic verification method for the malware download type can include an IP address verification step S9010, an access route verification step S9020, and/or a file download verification step S9030.

In the IP address verification step S9010, an automatic verification module according to one embodiment of the present invention can compare a source IP of a security event with an institution IP address to prevent a system or a computer of an institution from downloading a malware file. First of all, the automatic verification module can check whether or not the source IP is included in an institution IP list. Subsequently, if the source IP is included in the institution IP list, the automatic verification module can compare a destination IP of the security event with a black IP list. If the destination IP is not matched with a black IP, the automatic verification module can perform a next step for additional analysis. If the destination IP is identified as a black IP, the security event can be classified as a true positive (actual attack). If the destination IP is included in the institution IP list, the automatic verification module can compare the source IP with the black IP list. If the source IP belongs to a black IP, the security event can be classified as a true positive. If the source IP is not the black IP, the security event can be classified as a non-verification group which is necessary to be additionally analyzed by a security control personnel.

In the access route verification step S9020, the automatic verification module according to one embodiment of the present invention may verify an external access route to check whether a victim really intends to download a malware file or a normal file. First of all, the automatic verification module can identify a referrer belonging to a packet of a security event. If the referrer exists, the automatic verification module can check whether the referrer belongs to a white FQDN list or a black FQDN list. If the referrer belongs to the black FQDN list, the security event can be classified as a true positive group. If the referrer belongs to the white FQDN list, the security event can be classified as a false positive group. This is because it may consider that the security event is detected when a normal website is used. If the referrer does not belong to both the white FQDN list and the black FQDN list, the security event can be classified as a non-verification group. On the contrary, if the referrer does not exist, the automatic verification module can determine whether or not a host requested by a source IP and GET URL are accessible. If the host and the GET URL exist and the host and the GET URL are accessible, it can be considered as a victim has downloaded a malware file by accessing a malicious website. In particular, the security event can be classified as a true positive group. Yet, if the host and the GET URL do not exist or the host and the GET URL are not accessible, the automatic verification module can perform a next step. In this case, the referrer corresponds to HTTP referrer information extracted from the security event.

In the file download verifications step S9030, the automatic verification module can verify an activity related to file download. The automatic verification module can determine whether or not the number of security events, which have a source IP address and a destination IP address identical to an IP of a target institution, is greater than a threshold. In the file download verifications step, the automatic verification module can use information on the number of security events. If the number of security events, which are detected during 1 to 5 minutes, is greater than a threshold, it may indicate that an infected system or a PC continuously and automatically attempts to download a malware file in a website although the website is not accessible. Hence, in this case, the security event can be classified as a true positive group. If the number of security events, which are detected during 1 to 5 minutes, is not greater than the threshold, it is necessary for a security control personnel to analyze a reason that the security event intends to access the inaccessible website. Hence, in this case, the security event can be classified as a non-verification group for additional analysis of the security control personnel.

Figure 10:
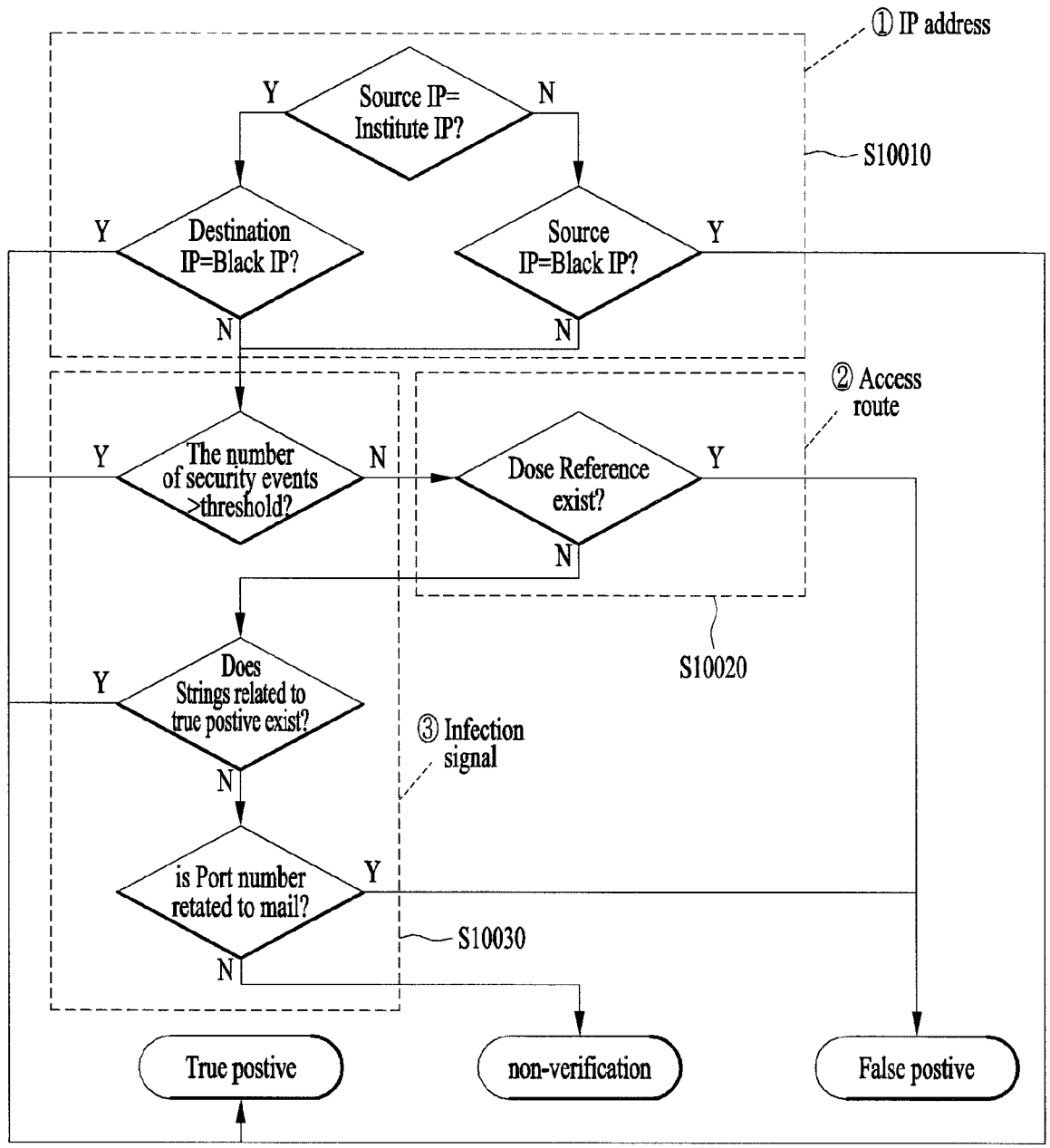
FIG. 10 is a flowchart for an automatic verification algorithm for a malware infection type according to one embodiment of the present invention.

FIG. 10 is a flowchart for an automatic verification algorithm for a malware infection type according to one embodiment of the present invention.

FIG. 10 shows a verification algorithm of a security event belonging to malware infection. A security event of a malware infection type can be detected when a system infected by a worm or a virus transmits an infection signal to a system constructed by an aggressor such as a command server, a stopover server, and the like to indicate that the system is infected by malware.

According to one embodiment of the present invention, an automatic verification method for the malware infection type can include an IP address verification step S10010, an access route verification step S10020, and/or an infection signal verification step S10030.

In the IP address verification step S10010, an automatic verification module according to one embodiment of the present invention checks whether or not a source IP of a security event corresponds to a target institution and may be then able to compare the source IP and a destination IP with a black IP list. This is because an IP address of the target institution infected by a worm or a virus can be misused as a command server that transmits an infection signal to an external server or receives an infection signal from the external. If the source IP or the destination IP is included in a black IP list, the security event is considered as an actual attack and can be classified as a true positive group. If the source IP or the destination IP is not included in a black IP list, the automatic verification module can perform a next step for additional verification.

In the access route verification step S10020, verifying a referrer is important. This is because a signal infected by malware is automatically transmitted by the malware. In the access route verification step, the automatic verification module can determine whether or not a referrer exists in a corresponding security event. If the referrer exists, the security event can be classified as a false positive group. This is because it is able to consider that the security event is detected by a character string identical to an infection signal when a normal webpage is used. If the referrer does not exist, the automatic verification module can perform a next step for additional verification.

In the infection signal verification step S10030, the automatic verification module can verify an activity related to transmission of an infection signal. To this end, the automatic verification module can determine whether or not the number of security events, which have the same source IP address and the same destination IP address, is greater than a threshold. If the number of security events of the same source IP and the same destination IP, which are detected within 24 hours, is greater than a threshold, it may indicate that a PC infected by malware repeatedly transmits an infection signal to a command server or a malicious server. Hence, in this case, the security event can be classified as a true positive group. If the number of security events of the same source IP and the same destination IP, which are detected within 24 hours, is not greater than the threshold, the automatic verification module can perform a next verification for more precise verification. This is because, although a connection corresponds to a normal connection, the security event of the malware infection type is detected when simple character strings belonging to a payload of a packet are matched with signature rules. Subsequently, the automatic verification module can compare a character string inputted by a security control personnel with a character string in a payload of the security event. In case of the malware infection type, a character string associated with a true positive may correspond to a meaningless value for an infection signal. If a character string of the security event corresponds to a character string associated with an infection signal, the security event can be considered as a true positive. On the contrary, if the character string of the security event is not a character string associated with the infection signal, the automatic verification module can check whether or not a port number of the security event is related to a mail port (e.g., SMPT (TCP/25), POP (TCP/109, 110, 143)) of the security event. When a mail is sent, data of the mail can be encoded using an encoding method of base 64. In case of the malware infection type, a security event can be detected when a mail is sent. This is because the security event can be accidentally matched with an encoded data of a mail together with a character string associated with an infection signal. Hence, if the port number of the security event is associated with the mail port, the security event can be considered as a false positive. If the port number of the security event is not associated with the mail port, the security event can be classified as a non-verification group, which is necessary to be additionally analyzed by a security control personnel.

Figure 11:
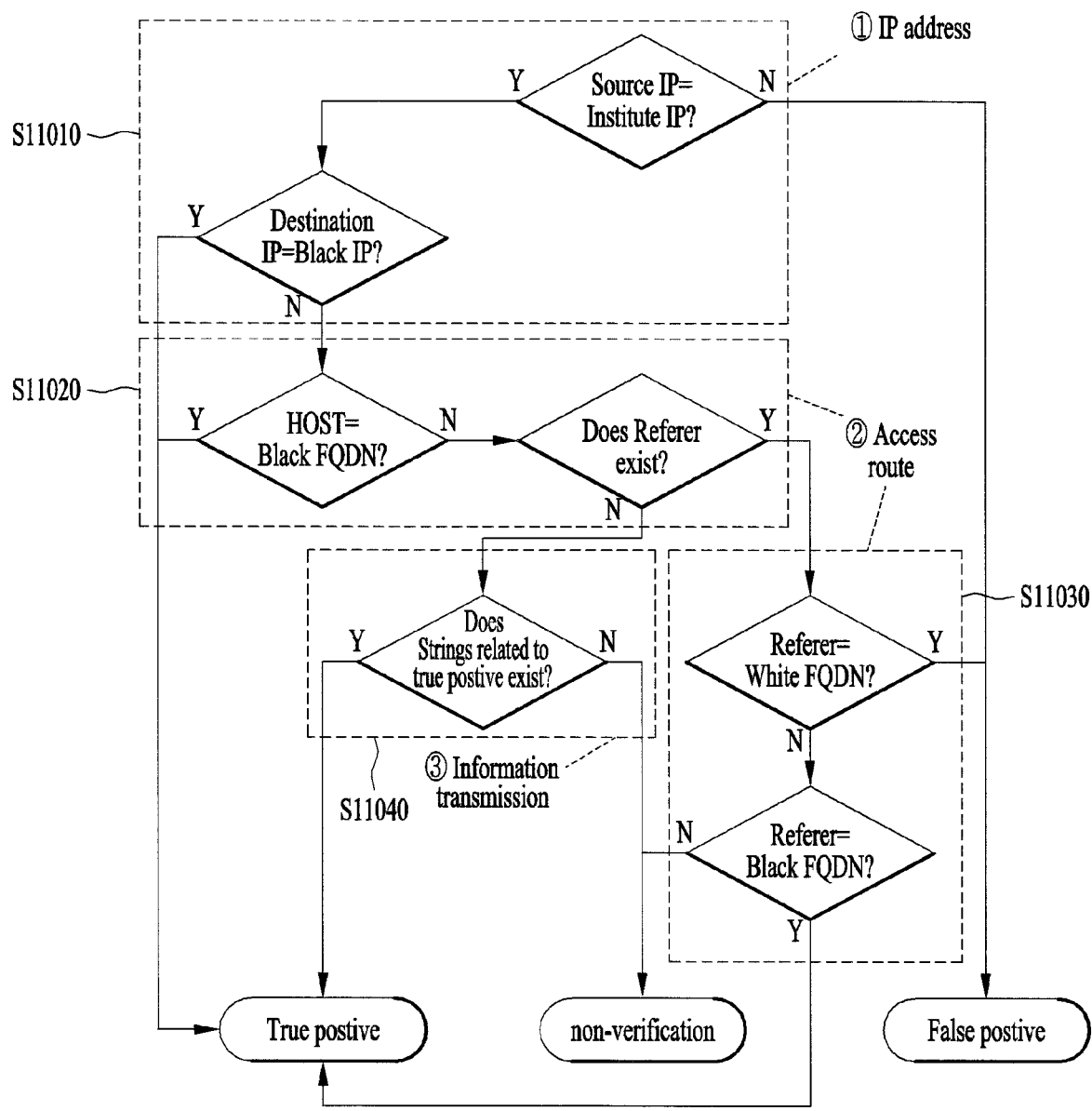
FIG. 11 is a flowchart for an automatic verification algorithm for an information transmission type according to one embodiment of the present invention.

FIG. 11 is a flowchart for an automatic verification algorithm for an information transmission type according to one embodiment of the present invention.

FIG. 11 shows an automatic verification algorithm of a security event belonging to an information transmission type. The security event belonging to the information transmission type can be detected when a system infected by a worm or a virus transmits system information of the system to an aggressor.

According to one embodiment of the present invention, an automatic verification method for the information transmission type can include an IP address verification step S11010, an access route verification step S11020/S11030, and/or an information transmission verification step S11040.

In the IP address verification step S11010, an automatic verification module according to one embodiment of the present invention can compare a source IP of a security event with an institution IP list. If the source IP is included in the institution IP list, the automatic verification module can compare a destination IP with a black IP list. If the source IP is not included in the institution IP list, the security event can be considered as a false positive. This is because the automatic verification module according to one embodiment of the present invention preferentially finds out an activity that a PC or a system of an institution IP transmits system information. If the destination IP is included in the black IP list, the security event is considered as an actual attack and can be classified as a true positive group. Yet, if the destination IP is not included in the black IP, the automatic verification module can perform a next step for additional analysis.

In the access route verification steps S11020/S11030, the automatic verification module according to one embodiment of the present invention can verify an external access route to check whether a victim really transmits important information to an aggressor or the victim transmits information to receive a normal service. The automatic verification module can determine whether or not a host requested by a user is included in a black FQDN list. If the host is included in the black FQDN list, the security event is considered as an actual attack and can be classified as a true positive group. If the host is not included in the black FQDN list, the automatic verification module can identify a referrer belonging to a packet of the security event. If the referrer exists, the automatic verification module can determine whether or not the referrer is included in the black FQDN list and/or a white FQDN list. If the referrer is included in the white FQDN list, the security event can be classified as a false positive group. This is because it is able to consider that the security event is detected when a normal website is used. If the referrer is included in the black FQDN list, the security event can be classified as a true positive group. If the referrer is not included in both the white FQDN list and the black FQDN list, the automatic verification module can perform a next step for additional analysis.

In the information transmission verification step S11040, the automatic verification module according to one embodiment of the present invention can compare a character string inputted by a security control personnel with a character string belonging to a payload of the security event. In case of the information transmission type, a character string associated with a true positive may correspond to a character string of a system or personal information. If the character string of the security event is identical to a character string associated with system information, the security event can be considered as a true positive. Yet, if the character string of the security event is not identical to the character string associated with the system information, the security event can be classified as a non-verification group, which is necessary to be additionally analyzed by a security control personnel.

Figure 12:
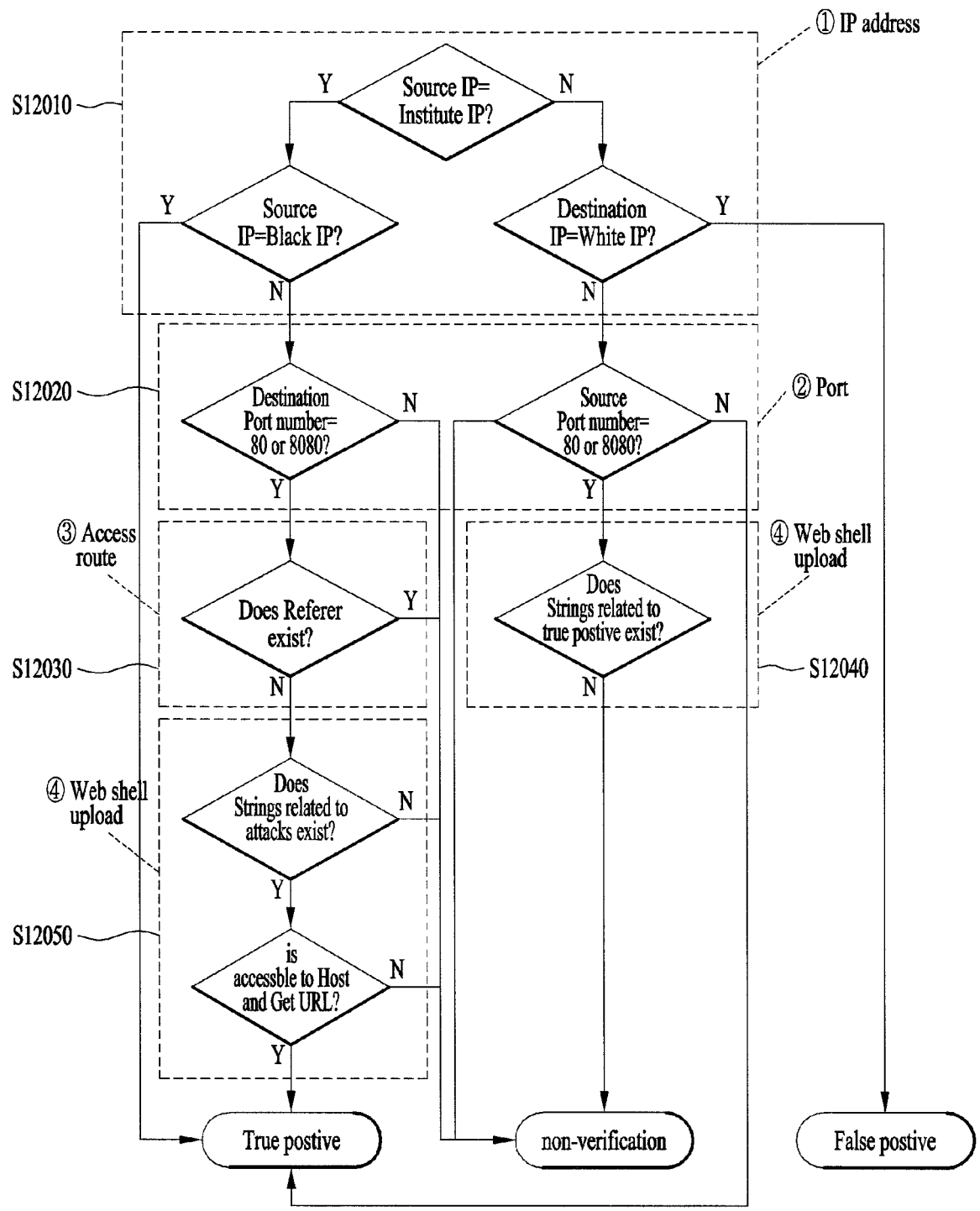
FIG. 12 is a flowchart for an automatic verification algorithm for a file upload type according to one embodiment of the present invention.

FIG. 12 is a flowchart for an automatic verification algorithm for a file upload type according to one embodiment of the present invention.

According to one embodiment of the present invention, a security event of a file upload type can be detected when a malicious code (e.g., web shell) is uploaded to a website to perform a malicious activity such as important information leakage from a corresponding web server, capturing access right, and the like by attacking the website in which security vulnerability exists. FIG. 12 shows an automatic verification algorithm of a security event belonging to a file upload type.

According to one embodiment of the present invention, an automatic verification method for a file upload type can include an IP address verification step S12010, a port verification step S12020, an access route verification step S12030, and/or a web shell upload verification steps S12040/S12050.

In the IP address verification step S12010, an automatic verification module according to one embodiment of the present invention checks whether or not a source IP of a security event corresponds to a target institution and may be then able to compare the source IP and a destination IP with a black IP list. This is because a web shell can be uploaded to a vulnerable homepage of an institution and important information of the institution can be transmitted to an external aggressor via the wen shell. If the source IP or the destination IP corresponds to a black IP, the security event is considered as an actual attack and can be classified as a true positive group. If the source IP or the destination IP is not the black IP, the automatic verification module can perform a next step for additional verification.

In the port verification step S12020, the automatic verification module can checks whether or not a destination port number is associated with a port (i.e., 80 or 8080) used for HTTP of the security event. This is because aggressors intend to communicate with the destination port to upload a web shell to a corresponding website. If the source IP of the security event is included in the institution IP list, the automatic verification module can check whether or not a source port number is associated with HTTP or a web port (i.e., 80 or 8080) of the security event. This is because the source port number associated with HTTP or the web port is used to transmit a response value in response to a webpage request. In particular, if the source port number is associated with the HTTP or the web port of the security event, the security event can be classified as a non-verification group, which is necessary to be additionally analyzed by a security control personnel. On the contrary, if the source port number is not associated with the HTTP or the web port of the security event, the automatic verification module can perform a next step for additional verification.

In the access route verification step S12030, the automatic verification module can determine whether or not a referrer exists in a payload of the security event. If the referrer exists, the security event can be classified as a non-verification group for additional verification. If the referrer does not exist, the automatic verification module can perform a next step for additional verification.

In the web shell upload verification steps S12040/S12050, the automatic verification module can compare a character string inputted by a security control personnel with a character string belonging to a payload of the security event. In case of a file upload type, a character string related to a true positive may correspond to a file name extension (e.g., .php.jpg, .asp.jpg, etc.). This is because aggressors use a weak point of a vulnerable system including no function of filtering script files (e.g., .asp, .php, etc.) in an upload page. Moreover, when important information is leaked to an aggressor, a character string related to a true positive may correspond to a system command. If the aforementioned character string does not exist in a payload of a security event, the security event can be classified as a non-verification group. If the aforementioned character string exists in the payload of the security event, the automatic verification module can determine whether or not a host requested by a source IP and GET URL are accessible. If the host and the GET URL exist and the host and the GET URL are accessible, it may be able to consider it as a victim has uploaded a web shell to a homepage. In this case, the security event can be classified as a true positive group. On the contrary, if the host and the GET URL do not exist or the host and the GET URL are not accessible, the security event can be considered as a non-verification group. According to one embodiment of the present invention, a character string related to a true positive may correspond to a character string related to an actual attack.

Figure 13:
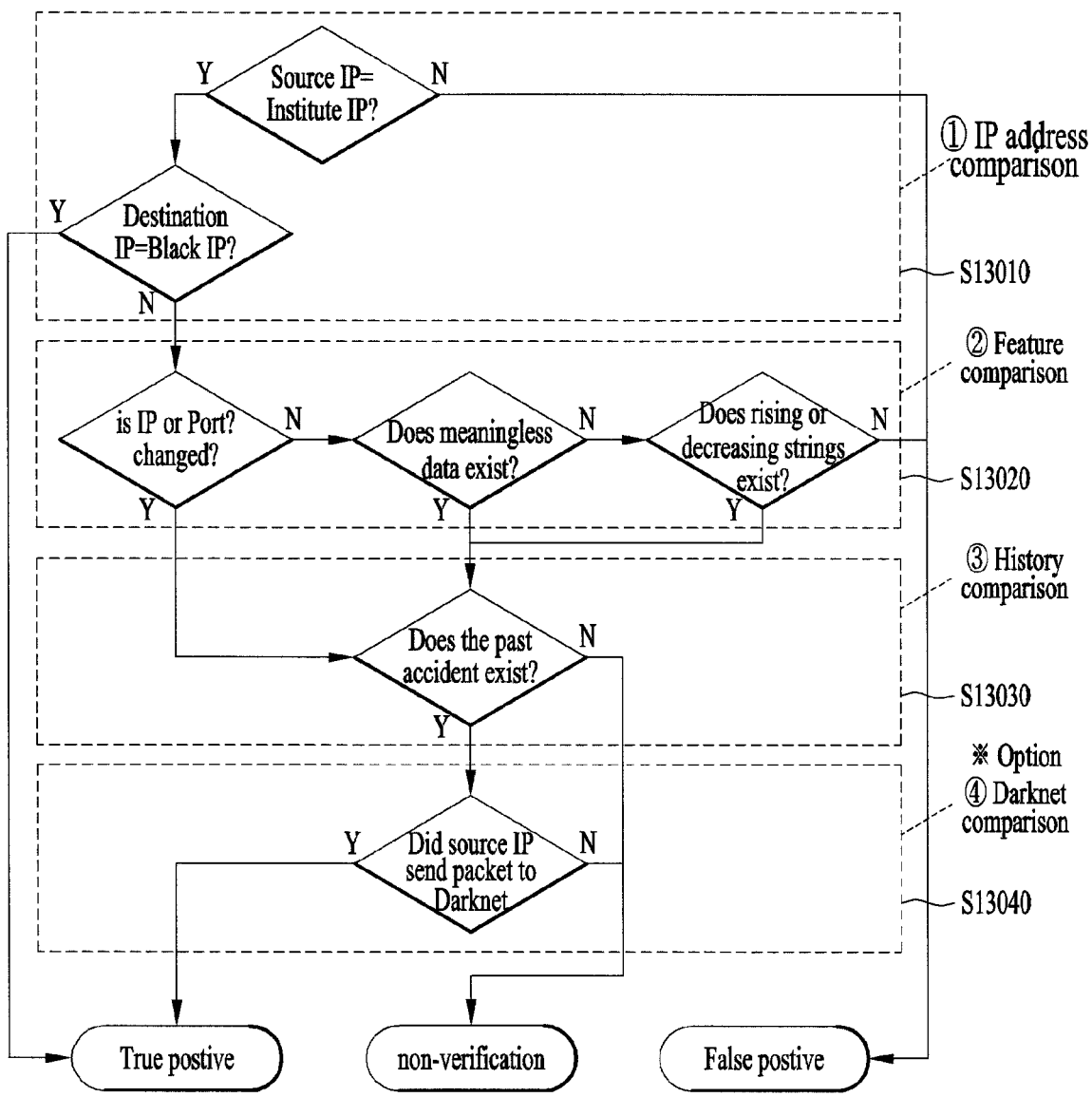
FIG. 13 is a flowchart for an automatic verification algorithm for a threshold-based security event according to one embodiment of the present invention.

FIG. 13 is a flowchart for an automatic verification algorithm for a threshold-based security event according to one embodiment of the present invention.

FIG. 13 shows an automatic verification algorithm of a threshold-based security event according to one embodiment of the present invention.

According to one embodiment of the present invention, an automatic verification method of a threshold-based security event can include an IP address comparison step S13010, a feature comparison step S13020, a history comparison step S13030, and/or a darknet comparison step S13040.

In the IP address comparison step S13010, an automatic verification module according to one embodiment of the present invention checks whether or not a source IP of the security event is included in an institution IP list and checks whether or not a destination IP of the security event is included in a black P list. A main purpose of the threshold-based security event according to one embodiment of the present invention is to transmit many packets to a target host or a network within a short period of time to make a victim not to provide a normal service or a work of the victim anymore. Hence, the source IP is compared with the institution IP list to find out an IP address related to an institution system that is infected by a worm or a virus and attacks an external victim. If the source IP is included in the institution IP list and the destination IP is not a black IP, the automatic verification module performs a next step. If the source IP is not included in the institution IP list, the security event can be classified as a false positive group. If the destination IP corresponds to the black IP, the security event can be classified as a true positive group.

In the feature comparison step S13020, the automatic verification module can compare extracted features with each other. In case of the threshold-based security event, the automatic verification module can check whether or not a destination IP or a port is changed. This is because aggressors generally change the destination IP or the port number to flood or scan an attack. The automatic verification module can determine whether or not a packet of the security event includes a repeated character string (meaningless character string). According to one embodiment of the present invention, packets of the threshold-based security event do not include a payload data in general. Instead, the packets of the threshold-based security event include a meaningless data corresponding to a value of a useless form (e.g., "XXXXX", "AAAAA", etc.). Moreover, some packets of the threshold-based security event may include a specific character string (e.g., "abcde", etc.) in ascending order or descending order. In order to automatically verify the threshold-based security event, the automatic verification module can use the aforementioned character string as a feature. If a destination IP and a port of the security event are not changed, a character string is not repeated in the security event, and the security event does not include a specific character string, the security event can be classified as a false positive group. On the contrary, if a destination IP and a port of the security event are changed, a character string is repeated in the security event, or the security event includes a specific character string, the automatic verification module performs history comparison as a next step.

In the history comparison step S13030, the automatic verification module can determine whether or not a different security event having a source IP identical to the source IP of the security event has a past history revealed by a recent actual attack. If the security event corresponds to the aforementioned security event including the past history, the automatic verification module can perform a next step. On the contrary, if the security event is not the security event including the past history, the security event can be classified as a non-verification group, which is necessary to be additionally analyzed.

In the darknet comparison step S13040, the automatic verification module can compare a source IP of the security event with an IP for a darknet. According to one embodiment of the present invention, packets, which are discovered on the darknet, can be considered as malicious activities. This is because the darknet corresponds to a set of unused IP addresses and the darknet is not an actual server or a system. If the source IP of the security event has a history that a packet is transmitted using a darknet IP, the security event can be classified as a true positive. On the contrary, if the source IP of the security event has no history that a packet is transmitted using a darknet IP, the security event can be classified as a non-verification group, which is necessary to be additionally analyzed. According to one embodiment of the present invention, the darknet comparison step can be omitted.

FIG. 14 is a diagram for statistic of detection rules (signature rules) according to one embodiment of the present invention.

According to one embodiment of the present invention, in order to testify the efficiency of the automatic verification method proposed in the present invention, security events identified by at least one or more actual attacks during 3 years are prepared as a sample. First of all, the security event automatic verification equipment according to one embodiment of the present invention classifies the security events into threshold-based security events and signature-based security events of 5 attack types. FIG. 14 shows a result of the classified detection rule. Referring to FIG. 14, the number of detection rules identified by at least one or more actual attacks in years 2013, 2014, and 2015 corresponds to 96, 70, and 38, respectively. Moreover, the number of unique detection rules from which the duplicated values are excluded is 134. The security event automatic verification equipment according to one embodiment of the present invention has used the detection rules in experiment. When the 134 detections rules are used, the total number of security events for an actual attack corresponds to 3074.

FIG. 15 is a diagram for accuracy of an automatic verification method according to a malicious URL type in accordance with one embodiment of the present invention.

According to one embodiment of the present invention, accuracy of the automatic verification method proposed in the present invention is measured according to each attack type. To this end, the automatic verification method according to one embodiment of the present invention is applied to a security event of each type and 4517 packets are testified by an actual attack. FIG. 15 shows an accuracy measurement result for a malicious URL type. Referring to FIG. 15, it is able to check a true positive (i.e., actual attack) for 36 unique security events among the malicious URL type. As a result, the total number of security events detected for 36 unique security events in years 2013, 2014, and 2015 corresponds to 2704674, 942475, and 797023, respectively. Moreover, the number of actual attacks correctly classified as a true positive in years 2013, 2014, and 2015 corresponds to 138, 111, and 221, respectively. The number of actual attacks correctly classified as a false positive in years 2013, 2014, and 2015 corresponds to 2704536, 942364, and 796802, respectively. Moreover, it is able to check that the accuracy of the automatic verification method proposed by the present invention for the malicious URL type is 100%.

FIG. 16 is a diagram for accuracy of an automatic verification method according to a malware download type in accordance with one embodiment of the present invention.

FIG. 16 shows an accuracy measurement result for a malware download type. Referring to FIG. 16, it is able to check a true positive (i.e., actual attack) for 5 unique security events among the malware download type. As a result, the total number of security events detected for 5 unique security events in years 2013, 2014, and 2015 corresponds to 7285, 36484, and 9651, respectively. Moreover, the number of actual attacks correctly classified as a true positive in years 2013, 2014, and 2015 corresponds to 206, 219, and 545, respectively. The number of actual attacks correctly classified as a false positive in years 2013, 2014, and 2015 corresponds to 7079, 63165, and 9106, respectively. Moreover, it is able to check that the accuracy of the automatic verification method proposed by the present invention for the malware download type is 100%.

FIG. 17 is a diagram for accuracy of an automatic verification method according to a malware infection type in accordance with one embodiment of the present invention.

FIG. 17 shows an accuracy measurement result for a malware infection type. Referring to FIG. 17, it is able to check a true positive (i.e., actual attack) for 52 unique security events among the malware infection type. As a result, the total number of security events detected for 52 unique security events in years 2013, 2014, and 2015 corresponds to U.S. Pat. Nos. 1,411,259, 1,849,2488, and 14810746, respectively. Moreover, the number of actual attacks for the 52 unique security events correctly classified as a true positive in years 2013, 2014, and 2015 corresponds to 504, 131, and 337, respectively. The number of actual attacks correctly classified as a false positive in years 2013, 2014, and 2015 corresponds to U.S. Pat. Nos. 1,410,755, 1,849,2357, and 14810409, respectively. Moreover, it is able to check that the accuracy of the automatic verification method proposed by the present invention for the malware infection type is 100%.

FIG. 18 is a diagram for accuracy of an automatic verification method according to an information transmission type in accordance with one embodiment of the present invention.

FIG. 18 shows an accuracy measurement result for an information transmission type. Referring to FIG. 18, it is able to check a true positive (i.e., actual attack) for 14 unique security events among the information transmission type. As a result, the total number of security events detected for 14 unique security events in years 2013, 2014, and 2015 corresponds to 42543, 7356, and 16756, respectively. Moreover, the number of actual attacks for the 14 unique security events correctly classified as a true positive in years 2013, 2014, and 2015 corresponds to 1277, 471, and 29, respectively. The number of actual attacks correctly classified as a false positive in years 2013, 2014, and 2015 corresponds to 41266, 6885, and 16727, respectively. Moreover, it is able to check that the accuracy of the automatic verification method proposed by the present invention for the information transmission type is 100%.

FIG. 19 is a diagram for accuracy of an automatic verification method according to a file upload type in accordance with one embodiment of the present invention.

FIG. 19 shows an accuracy measurement result for a file upload type. Referring to FIG. 19, it is able to check a true positive (i.e., actual attack) for 21 unique security events among the information transmission type. As a result, the total number of security events detected for 21 unique security events in years 2013, 2014, and 2015 corresponds to 88414, 1222146, and 28795133, respectively. Moreover, the number of actual attacks for the 21 unique security events correctly classified as a true positive in years 2013, 2014, and 2015 corresponds to 22, 37, and 54, respectively. The number of actual attacks correctly classified as a false positive in years 2013, 2014, and 2015 corresponds to 88392, 1222109, and 28795079, respectively. Moreover, it is able to check that the accuracy of the automatic verification method proposed by the present invention for the file upload type is 100%.

FIG. 20 is a diagram for accuracy of an automatic verification method for a threshold-based security event according to one embodiment of the present invention.

FIG. 20 shows an accuracy measurement result of automatic verification performed on a threshold-based security event. According to one embodiment of the present invention, in case of a threshold-based security event, 6 security events identified by at least one or more actual attacks were collected in the year 2014. Yet, TCP null scan and UDP port scan were verified using data collected between the year 2009 and the year 2011. This is because there is no data on the TCP null scan and the UDP port scan after the year 2011. In particular, referring to FIG. 20, it is able to check 215 true positives (actual attacks) for 6 threshold-based security events. As a result, it is able to check that 215 actual attacks are correctly classified as true positives for the 6 threshold-based security events. Moreover, it is able to check that the accuracy of the automatic verification method proposed by the present invention for threshold-based security event is 100%. The security event automatic verification equipment according to one embodiment of the present invention provides a method of automatically verifying an attack type-based security event. A main purpose of one embodiment of the present invention is to identify an actual attack from lots of security events to enable a security control personnel to efficiently perform security monitoring and response and filter a false positive. According to one embodiment of the present invention, the method of automatically verifying the attack type-based security event can include a feature extraction step, a type classification step, and/or an automated verification step. In order to measure efficiency of the automatic verification method proposed by the present invention, 134 detection rules were used and 4517 security events were extracted using the 134 detection rules. According to one embodiment of the present invention, the 4517 security events were classified into 6 groups according to an attack type and accuracy of the verification method was measured according to each type. As a result, it was able to check that the accuracy shows about 100% while maintaining a low false positive rate in every type.

Figure 21:
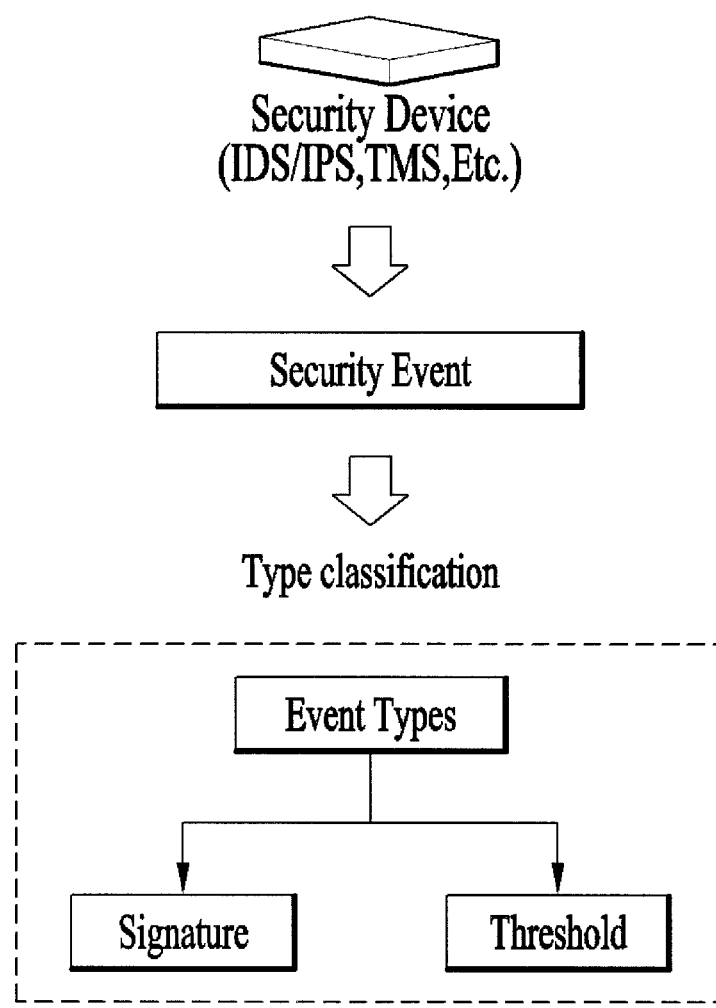
FIG. 21 is a diagram for a process of classifying types of a security event according to one embodiment of the present invention.

FIG. 21 is a diagram for a process of classifying types of a security event according to one embodiment of the present invention.

According to one embodiment of the present invention, a type classification step can classify an event type and/or an attack type. First of all, the event type is explained. A TMS can detect and record a security event of two types based on a detection mechanism. In this case, the two types include a signature-based security event and a threshold-based security event. A type classification module according to one embodiment of the present invention can classify security events into a signature-based security event and a threshold-based security event to verify a security event according to each type in the automated verification step. According to one embodiment of the present invention, the signature-based security event can be classified again according to an attack type. In this case, the signature-based security event according to one embodiment of the present invention corresponds to a security event triggered by a packet including a character string identical to a predefined character string (a combination of alphabetical character/number/special symbol or regular expressions). The threshold-based security event according to one embodiment of the present invention corresponds to a security event which is triggered when a specific packet exceeds a predefined threshold (occurrence frequency per unit time). According to one embodiment of the present invention, the signature-based security event and/or the threshold-based security event can be detected by a detection method such as a detection rule-based security device (IDS/IPS, TMS, etc.). For example, the detection rule-based security device (IDS/IPS, TMS, etc.) may correspond to a system configured to detect a security event triggered by exceeding a predefined occurrence frequency (threshold) or a system configured to detect all security events including a predefined character string pattern.

Figure 22:
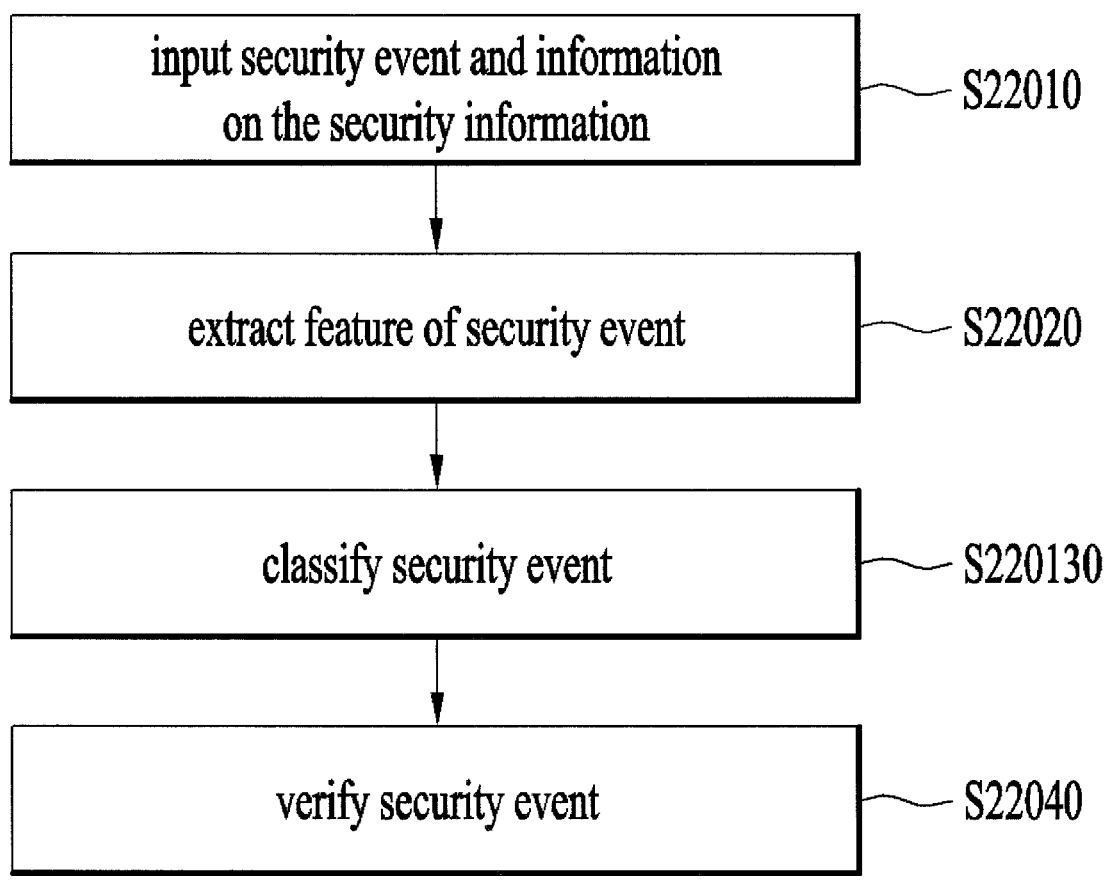
FIG. 22 is a flowchart for a method of automatically verifying a security event according to one embodiment of the present invention.

FIG. 22 is a flowchart for a method of automatically verifying a security event according to one embodiment of the present invention.

A security event automatic verification method according to one embodiment of the present invention can include a step of receiving a security event and information on a security event [S22010], a step of extracting a feature of a security event [S22020], a step of classifying security event [S22030], and/or a step of verifying a security event [S22040].

The step of receiving a security event and information on a security event [S22010] is mentioned earlier in FIGS. 2, 3, and 7.

The step of extracting a feature of a security event [S22020] is mentioned earlier in FIGS. 2, 5, and 7.

The step of classifying security event [S22030] is mentioned earlier in FIGS. 2, 6, and 7.

The step of verifying a security event [S22040] is mentioned earlier in FIGS. 2, 4, 7, 8, 9, 10, 11, 12 and 13.

A module, a unit, or a block according to embodiments of the present invention may correspond to a processor/hardware configured to execute continuous processes stored in a memory (or a storing unit). Each of the steps or methods described in the aforementioned embodiments can be performed by hardware/processors. And, the methods proposed in the present invention can be executed by a code. The code can be written on a storing media readable by a processor. In particular, the code is readable by a processor provided by an apparatus according to the embodiments of the present invention.

For clarity, although each drawing is explained in a manner of being divided, embodiments described for each drawing can be combined with each other to implement a new embodiment. And, according to necessity of those skilled in the art, designing a recording media readable by a computer in which a program for executing the aforementioned embodiments are recorded also belongs to the scope of right of the present invention.

The aforementioned apparatus and the method are not restricted by the configuration and the method of the aforementioned embodiments. In order to make various variations from the embodiments, all or a part of the embodiments can be selectively combined.

Meanwhile, an image processing method of the present invention can be implemented by a code readable by a processor in a recording media readable by a processor mounted on a network device. The recording media readable by the processor includes all types of recording devices in which data readable by the processor is stored. The examples of the recording media readable by the processor may include a ROM, a RAM, a CD-ROM, a magnetic tape, a floppy disc, an optical data storing device and the like. And, implementing in a form of a carrier wave such as a transmission via the internet and the like is also included. And, since the recording media readable by the processor are distributed to the computer systems connected by a network, codes readable by the processor can be stored and executed in a manner of being distributed.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

MODE FOR INVENTION

Various embodiments are explained in the best mode for implementing the present invention.

INDUSTRIAL APPLICABILITY

The present invention is used in a series of information protection fields.

It will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of automatically verifying a security event, comprising the steps of:
    detecting, by a security equipment, a security event and information on the security event;
    extracting, by a processor, a feature of the security event;
    classifying, by the processor, the security event into a signature-based security event containing a specific character string set to the security equipment or a threshold-based security event triggered by exceeding a threshold set to the security equipment;
    classifying, by the processor, the signature-based security event according to one of attack types related with the security event, wherein the feature of the security event includes static components and dynamic components, and the attack types are classified based on the static components and the dynamic components; and
    verifying, by the processor, whether or not the detected security event corresponds to a true positive by comparing the extracted feature of the security event with the information on the security event according to one of an automatic verification algorithm for the threshold-based security event and of an automatic verification algorithm for the signature-based security event,
    wherein the automatic verification algorithm for the signature-based security event includes an access route verification process according to one of the attack types, and
    wherein the access route verification process verifies the detected security event through determining whether or not a reference related with the true positive or a false positive exists in the detected security event.

2. The method of claim 1, wherein the signature-based security event comprises at least one selected from the group including a malicious URL type, a malware download type, a malware infection type, an information transmission type, and a file upload type.

3. The method of claim 2, wherein the feature of the security event comprises a static component essential for verifying the security event and a dynamic component subsidiary for verifying the security event, wherein the static component comprises at least one selected from the group including source IP information, destination IP information, source port information, destination port information, host information, payload information, HTTP (hypertext transfer protocol) referrer information, and information on the number of security events, and wherein the dynamic component comprises at least one selected from the group including host and GET URL information, Get URL information, website source code information, and destination port information.

4. The method of claim 3, wherein the information on the security event comprises an essential component essential for verifying the security event and an additional component subsidiary for verifying the security event,
    wherein the essential component comprises institute IP list information indicating a list of IP addresses of institutions corresponding to a target of attack, and
    wherein the additional component comprises at least one selected from the group including black IP list information indicating a list of black IP addresses corresponding to malicious IP addresses used for attack, white IP list information indicating a list of white IP addresses corresponding to IP addresses used for normal communication, black FQDN list information indicating a list of black FQDN (fully qualified domain name) corresponding to a domain name of a host used for attack, white FQDN list information indicating a list of white FQDN corresponding to a domain name of a host used for normal communication, and specific character string list information containing specific character string information to indicate a correctly detected security event.

5. The method of claim 4, wherein the automatic verification algorithm for the signature-based security event includes a verification algorithm for the malicious URL type, and the verification algorithm for the malicious URL type comprises the step of checking whether or not the source IP information of the security event is contained in the institution IP list information.

6. The method of claim 4, wherein the automatic verification algorithm for the signature-based security event includes a verification algorithm for the malware download type, and the verification algorithm for the malware download type comprises the steps of:
    checking whether or not the source IP information of the security event is contained in the institution IP list information;
    checking whether or not the source IP information of the security event is contained in the black IP list information; and checking whether or not the destination IP information of the security event is contained in the black IP list information.

7. The method of claim 4, wherein the automatic verification algorithm for the signature-based security event includes a verification algorithm for the malware infection type, and the verification algorithm for the malware infection type comprises the steps of:
checking whether or not the source IP information of the security event is contained in the institution IP list information;
checking whether or not the source IP information of the security event is contained in the black IP list information; and
checking whether or not the destination IP information of the security event is contained in the black IP list information.

8. The method of claim 4, wherein the automatic verification algorithm for the signature-based security event includes a verification algorithm for the information transmission type, and the verification algorithm for the information transmission type comprises the steps of:
checking whether or not the source IP information of the security event is contained in the institution IP list information; and
checking whether or not the destination IP information of the security event is contained in the black IP list information.

9. The method of claim 4, wherein the automatic verification algorithm for the signature-based security event includes a verification algorithm for the file upload type, and the verification algorithm for the file upload type comprises the steps of:
checking whether or not the source IP information of the security event is contained in the institution IP list information;
checking whether or not the source IP information of the security event is contained in the black IP list information; and
checking whether or not the destination IP information of the security event is contained in the white IP list information.

10. The method of claim 4, wherein the automatic verification algorithm for the threshold-based security event comprises the steps of:
checking whether or not the source IP information of the security event is contained in the institution IP list information; and
checking whether or not the destination IP information of the security event is contained in the black IP list information.

11. An equipment for automatically verifying a security event, comprising:
a security equipment configured to detect a security event and information on the security event;
and a processor configured to:
extract a feature of the security event;
classify the security event into a signature-based security event containing a specific character string set to the security equipment or a threshold-based security event triggered by exceeding a threshold set to the security equipment;
classify the signature-based security event according to one of attack types related with the security event, wherein the feature of the security event includes static components and dynamic components, and the attack types are classified based on the static components and the dynamic components; and
verify whether or not the detected security event corresponds to a true positive by comparing the extracted feature of the security event with the information on the security event according to one of an automatic verification algorithm for the threshold-based security event and an automatic verification algorithm for the signature-based security event,
wherein the automatic verification algorithm for the signature-based security event includes an access route verification process according to one of the attack types, and
wherein the access route verification process verifies the detected security event through determining whether or not a reference related with the true positive or a false positive exists in the detected security event.

12. The equipment of claim 11, wherein the signature-based security event comprises at least one selected from the group including a malicious URL type, a malware download type, a malware infection type, an information transmission type, and a file upload type.

13. The equipment of claim 12, wherein the feature of the security event comprises a static component essential for verifying the security event and a dynamic component subsidiary for verifying the security event, wherein the static component comprises at least one selected from the group including source IP information, destination IP information, source port information, destination port information, host information, payload information, HTTP (hypertext transfer protocol) referrer information, and information on the number of security events, and wherein the dynamic component comprises at least one selected from the group including host and GET URL information, Get URL information, website source code information, and destination port information.

14. The equipment of claim 13, wherein the information on the security event comprises an essential component essential for verifying the security event and an additional component subsidiary for verifying the security event,
wherein the essential component comprises institute IP list information indicating a list of IP addresses of institutions corresponding to a target of attack, and wherein the additional component comprises at least one selected from the group including black IP list information indicating a list of black IP addresses corresponding to malicious IP addresses used for attack, white IP list information indicating a list of white IP addresses corresponding to IP addresses used for normal communication, black FQDN list information indicating a list of black FQDN (fully qualified domain name) corresponding to a domain name of a host used for attack, white FQDN list information indicating a list of white FQDN corresponding to a domain name of a host used for normal communication, and specific character string list information containing specific character string information to indicate a correctly detected security event.

15. The equipment of claim 14, wherein the automatic verification algorithm for the signature-based security event includes a verification algorithm for the malicious URL type, and the verification algorithm for the malicious URL type comprises the step of checking whether or not the source IP information of the security event is contained in the institution IP list information.

16. The equipment of claim 14, wherein the automatic verification algorithm for the signature-based security event includes a verification algorithm for the malware download type, and the verification algorithm for the malware download type comprises the steps of:
- checking whether or not the source IP information of the security event is contained in the institution IP list information;
- checking whether or not the source IP information of the security event is contained in the black IP list information; and
- checking whether or not the destination IP information of the security event is contained in the black IP list information.

17. The equipment of claim 14, wherein the automatic verification algorithm for the signature-based security event includes a verification algorithm for the malware infection type, and the verification algorithm for the malware infection type comprises the steps of:
- checking whether or not the source IP information of the security event is contained in the institution IP list information;
- checking whether or not the source IP information of the security event is contained in the black IP list information; and
- checking whether or not the destination IP information of the security event is contained in the black IP list information.

18. The equipment of claim 14, wherein the automatic verification algorithm for the signature-based security event includes a verification algorithm for the information transmission type, and the verification algorithm for the information transmission type comprises the steps of:
- checking whether or not the source IP information of the security event is contained in the institution IP list information; and
- checking whether or not the destination IP information of the security event is contained in the black IP list information.

19. The equipment of claim 14, wherein the automatic verification algorithm for the signature-based security event includes a verification algorithm for the file upload type, and the verification algorithm for the file upload type comprises the steps of:
- checking whether or not the source IP information of the security event is contained in the institution IP list information;
- checking whether or not the source IP information of the security event is contained in the black IP list information; and
- checking whether or not the destination IP information of the security event is contained in the white IP list information.

20. The equipment of claim 14, wherein the automatic verification algorithm for the threshold-based security event comprises the steps of:
- checking whether or not the source IP information of the security event is contained in the institution IP list information; and
- checking whether or not the destination IP information of the security event is contained in the black IP list information.

* * * * *